(12) United States Patent
Mitra et al.

(10) Patent No.: US 11,955,257 B2
(45) Date of Patent: Apr. 9, 2024

(54) JOINS HAVING AT LEAST PARTIALLY CRYSTALLIZED GLASS

(71) Applicant: SCHOTT AG, Mainz (DE)

(72) Inventors: Ina Mitra, Stadecken-Elsheim (DE); Christian Mix, Landshut (DE); Björn Ramdohr, Landshut (DE); Helmut Hartl, Vienna (AT); Mark Stronczek, Munich (DE)

(73) Assignee: SCHOTT AG, Mainz (DE)

( * ) Notice: Subject to any disclaimer, the term of this patent is extended or adjusted under 35 U.S.C. 154(b) by 362 days.

(21) Appl. No.: 17/315,177

(22) Filed: May 7, 2021

(65) Prior Publication Data

US 2021/0265083 A1    Aug. 26, 2021

Related U.S. Application Data

(63) Continuation of application No. PCT/EP2019/080467, filed on Nov. 7, 2019.

(30) Foreign Application Priority Data

Nov. 7, 2018 (DE) .................. 10 2018 127 748.2
Feb. 1, 2019 (DE) .................. 10 2019 102 525.7
Jun. 21, 2019 (EP) ..................... 19181866

(51) Int. Cl.
*H01B 17/30* (2006.01)
*C03C 3/095* (2006.01)
(Continued)

(52) U.S. Cl.
CPC ........... *H01B 17/305* (2013.01); *C03C 3/095* (2013.01); *C03C 8/02* (2013.01); *C03C 8/24* (2013.01);
(Continued)

(58) Field of Classification Search
None
See application file for complete search history.

(56) References Cited

U.S. PATENT DOCUMENTS

2002/0115549 A1    8/2002  Geier
2007/0238599 A1   10/2007  Pinkney
(Continued)

FOREIGN PATENT DOCUMENTS

DE        10016416      10/2001
DE     102008045816      3/2010
(Continued)

OTHER PUBLICATIONS

English translation of International Preliminary Report on Patentability dated May 20, 2021 for PCT/EP2019/080467, 9 pages.
(Continued)

*Primary Examiner* — Hoa C Nguyen
*Assistant Examiner* — John B Freal
(74) *Attorney, Agent, or Firm* — Ruggiero McAllister & McMahon LLC

(57) ABSTRACT

A join is provided that has an electrically insulating component and two joining partners secured to one another and electrically insulated from one another by the electrically insulating component. The electrically insulating component has a surface that extends between the two joining partners. The surface defines a structure selected from a group consisting of an elevation, a depression, and any combinations thereof. The structure elongates a direct path along the surface. The structure completely surrounds at least one of the two joining partners. The electrically insulating component and/or the structure includes a glass that is at least partially crystallized.

26 Claims, 7 Drawing Sheets

(51) Int. Cl.
  *C03C 8/02* (2006.01)
  *C03C 8/24* (2006.01)
  *C03C 10/00* (2006.01)
  *C03C 27/02* (2006.01)
  *C03C 27/04* (2006.01)
  *G01N 27/406* (2006.01)
  *G01N 27/407* (2006.01)
  *H01B 3/08* (2006.01)
  *H01R 4/70* (2006.01)

(52) U.S. Cl.
  CPC .............. *C03C 10/00* (2013.01); *C03C 27/02* (2013.01); *C03C 27/044* (2013.01); *G01N 27/4062* (2013.01); *G01N 27/4078* (2013.01); *H01B 3/087* (2013.01); *H01R 4/70* (2013.01)

(56) References Cited

U.S. PATENT DOCUMENTS

| | | | |
|---|---|---|---|
| 2007/0238601 | A1 | 10/2007 | Pinckney |
| 2010/0129726 | A1 | 5/2010 | Tanida |
| 2013/0108946 | A1 | 5/2013 | Connelly |
| 2013/0272774 | A1 | 10/2013 | Goedeke |
| 2015/0083487 | A1 | 3/2015 | Leedecke |
| 2016/0236967 | A1 | 8/2016 | Maeda |
| 2016/0311720 | A1* | 10/2016 | Suffner .................... C03C 8/02 |
| 2017/0088456 | A1 | 3/2017 | Rampf |
| 2019/0112225 | A1 | 4/2019 | Mix |
| 2020/0048141 | A1 | 2/2020 | Maeda |

FOREIGN PATENT DOCUMENTS

| | | |
|---|---|---|
| DE | 102010035251 | 11/2012 |
| DE | 102011080352 | 2/2013 |
| DE | 102012206266 | 7/2013 |
| DE | 102014218983 | 3/2015 |
| DE | 102015207285 | 10/2016 |
| JP | 2001093596 | 4/2001 |
| JP | 2008513346 | 5/2008 |
| JP | 2010150086 | 7/2010 |
| JP | 2011241092 | 12/2011 |
| JP | 2012206891 | 10/2012 |
| WO | 2007001380 | 1/2007 |
| WO | 2017220700 | 12/2017 |
| WO | 2018066635 | 4/2018 |

OTHER PUBLICATIONS

ISO 16750-3, "Road vehicles—Environmental conditions and testing for electrical and electronic equipment—Part 3: Mechanical loads", Second Edition, Aug. 1, 2007, 44 pages.
Tulyaganov, "Aluminosilicate-based sealants for SOFCs and other electrochemical applications—A brief review", Journal of Power Sources vol. 242, 2013, pp. 486-502.
ISO 7884-8, supercedes DIN 52324, "Glass—Viscosity and viscometric fixed points—Part 8: Determination of (dilatometric) transformation temperature", Feb. 1998, 7 pages.
Reddy, "Study of melilite based glasses and glass-ceramics nucleated by $Bi_2O_3$ for functional applications", RSC Advances, 2012, vol. 2, pp. 10955-10967.
ISO 7991, "Glass—Determination of coefficient of mean linear thermal expansion", First Edition, Dec. 15, 1987, 12 pages.
English translation of DIN 52326, "Determination of the specific electrical volume resistance", May 1986, 8 pages.
English translation of DIN 51730, "Solid fuel testing—Determination of the ash melting behavior", Sep. 2007, 16 pages.
English translation of International Search Report dated Feb. 3, 2020 for PCT/EP2019/080467.
English translation of Written Opinion dated Feb. 3, 2020 for PCT/EP2019/080467.

* cited by examiner

JOINS HAVING AT LEAST PARTIALLY CRYSTALLIZED GLASS

CROSS REFERENCE TO RELATED APPLICATIONS

This is a continuation of International Application PCT/EP2019/080467 filed Nov. 7, 2019, which claims benefit under 35 USC § 119 of German Application 10 2018 127 748.2 filed Nov. 7, 2018, claims benefit under 35 USC § 119 of German Application 10 2019 102 525.7 filed Feb. 1, 2019, and claims benefit under 35 USC § 119 of European Application 19181866.5 filed Jun. 21, 2019, the entire contents of all of which are incorporated herein by reference.

BACKGROUND

1. Field of the Invention

The invention relates to a join comprising an insulating component, in particular comprising an at least partially crystallized glass, its use, and to a crystallizable and at least partially crystallized glass and its use. There are various fields of application for joins, in which temperature resistance, mechanical stability, and their electrical resistance can be of importance.

2. Description of Related Art

If such joins are integrated in sections of exhaust gas systems of internal combustion engines, for example in motor vehicles with controlled exhaust gas cleaning, for example for feeding electrical or electronic signals, then the ambient conditions will often change significantly. In cold start operation, for example, in particular in rather cold regions or with high air humidity, such joins may be covered with moisture films of condensed atmospheric constituents. This condensation can manifest itself in a formation of droplets or even full-surface coverage of the join. As a result, the electrical resistance between joining partners may change undesirably, and appropriate control of the exhaust gas cleaning may be impaired in terms of control behavior.

Although extremely high-resistance insulation materials can be used, as will be explained in more detail below with reference to crystallizable or at least partially crystallized glasses, these materials will often not be sufficiently reliable for an unimpaired control behavior in such an environment, given the impairments described above.

Document DE 10 2008 045 816 A1 proposes an elastomeric material surrounding a conductor in order to elongate a creepage distance, which in the context of the present disclosure is the distance along which creepage currents can arise between the joining partners. A drawback of this solution is that elastomeric materials often do not exhibit the thermal stability and long-term durability under continuous operation that is required for the hot section of exhaust gas systems.

SUMMARY

One aspect of the present invention addresses better protection of the electrical or electronic, in particular high-resistance insulation properties of the insulation materials presently disclosed, in particular of the crystallizable or partially crystallized glasses presently disclosed, against ambient influences.

This aspect of the object of the invention is achieved by a join comprising an electrically insulating component and at least two joining partners, wherein at least one of the joining partners 51, 52 is kept electrically insulated from at least one further of the joining partners 51, 52 by the electrically insulating component 53, and wherein the surface of the electrically insulating component 53, which extends between the joining partners, defines a structure S, in particular an elevation or depression, which elongates in particular the direct path along the surface from the at least one joining partner to the at least one further joining partner compared to a surface without this structure S, and wherein the structure preferably completely surrounds at least one joining partner, wherein the insulating component or the structure comprises or is made of crystallizable or at least partially crystallized glass and its use.

In the context of the present disclosure, 'kept electrically insulated' means to be retained in a manner such that a direct current resistance between the joining partners of the join presently described, when held in a dry atmosphere and without any deposits on the join that could impair this resistance, is greater than 100 MΩ, and this electrical resistance value is measured at voltages of less than 100 V.

The aforementioned structure S may be made integrally with and of the same material as the portion of the insulating component extending between the joining partners and bonded to each of the joining partners and preferably glass-fused thereto, and, preferably, the material of the insulating component comprises an at least partially crystallized glass and its use.

In the transition zone between the surface of the joining partner and the surface of the at least partially crystallized glass, an at least predominantly amorphous glass layer may be provided in the presently disclosed joins, which glass layer preferably comprises less than 10 pores per $cm^3$ and/or preferably has a thickness of 5 µm or less, more preferably 2 µm or less, and most preferably 1 µm or less.

In the presently described joins, the structure S may comprise crystallizable or at least partially crystallized glass, and on the surface of the structure S an at least predominantly amorphous glass layer may be provided, in particular in the form of a glass layer which is substantially void of open pores and in particular includes less than 10 pores per $cm^3$, and which has a thickness of 5 µm or less, preferably 2 µm or less, and most preferably 1 µm or less.

Furthermore, embodiments of joins will be disclosed below, in which the structure S is not made of the same material as the portion of the insulating component which extends between the joining partners and is bonded to each of the joining partners and preferably glass-fused thereto.

In such a join in which the structure S is not made of the same material as the portion of the insulating component which extends between the joining partners and is bonded to each of the joining partners and preferably glass-fused thereto, the structure may comprise a high-temperature stable ceramic material such as forsterite, an aluminum oxide-based ceramic, or a zirconium oxide-based ceramic, for example a ceramic comprising Y-stabilized zirconium oxide.

In the case of the join in which the structure S is not made of the same material as the portion of the insulating component which extends between the joining partners and is bonded to each of the joining partners and preferably glass-fused thereto, the structure S can be disposed on the portion of the insulating component so as to be approximately centered in a radial direction thereof and preferably protrudes into it, at least with a portion thereof.

In an advantageous join in which the structure S includes a reinforcement, the reinforcement may comprise a metal sheet or a metal foil or a metallic laid scrim, mesh, or knitted fabric, and the metal preferably comprises or is made of a steel.

In the presently disclosed embodiments, the structure S may have edges which have a rounding radius Rv of less than one tenth of a millimeter, preferably of less than one twentieth of a millimeter, and of more than 10 μm.

The crystallizable or at least partially crystallized glass according to the presently described embodiments allows to enlarge the surface of the insulating material that is located between joining partners that are to be insulated from one another, by the structure S presently described, and thus allows to elongate the creepage distance along the surface of the insulating component.

The crystallizable or at least partially crystallized glass according to the presently described embodiments allows to produce high-temperature resistant and/or mechanically highly resilient joins. As stated above, a crystallizable or at least partially crystallized glass according to the described embodiments allows to form a particularly stable microstructure in the at least partially crystallized glass, in particular a microstructure which is mechanically stable even at high temperatures of up to 1000° C. or even above.

Another aspect consequently relates to crystallizable glasses and glasses which are provided in an at least partially crystallized state and which are used in the field of solder glasses, inter alia. Solder glasses (also known as glass solder or 'sealing glasses') are used to produce tight bonds between the components to be joined. Such bonds are also referred to as join compounds or joins.

Usually, in order to produce stable joins that are exposed to very high temperatures during operation, such as temperatures of 900° C. or more, for example even temperatures of about 1000° C., solder glasses are required which are able to withstand these high temperatures on the one hand, and which on the other hand are matched in their expansion behavior to the materials to be joined. The materials to be joined are, for example, high-temperature resistant metals and/or metal alloys, and also high-temperature resistant non-metallic materials such as yttrium-stabilized $ZrO_2$.

Furthermore, the joins have to be hermetically tight, and, in particular when used in electrical components such as in sensor technology and/or in fuel cells, must have an electrically insulating effect, i.e., exhibit only very low electrical conductivity.

However, commercially available glass solders with high thermal expansion usually have low melting temperatures, which limits their thermal stability, and therefore these glass solders cannot be used at high temperatures. Glass solders for high temperature ranges, in turn, have thermal expansion coefficients that are very far below the thermal expansion coefficients of the high-temperature resistant joining partners.

Various glass solders have been proposed for producing joins in the prior art.

German patent application DE 100 16 416 A1 discloses glass-ceramic seals, for which the starting glass used is composed of 38 wt % to 48 wt % of $SiO_2$, 15 wt % to 19 wt % of $Al_2O_3$, 4.5 wt % to 11 wt % of $TiO_2$, 0 wt % to 1.5 wt % of $Na_2O$, 0 wt % to 1.5 wt % $K_2O$, and 23 wt % to 30 wt % of CaO, and additionally up to 1.5 wt % of $Li_2O$ may be added. With these compositions, thermal expansion coefficients of at most $8.8*10^{-6}$/K can be achieved in the temperature range from 100° C. to 500° C.

German patent DE 10 2012 206 266 B3 describes a glassy or glass ceramic joining material that is free of barium and strontium, as well as its use. In order to achieve sufficient wetting of the components to be bonded, the joining material comprises $B_2O_3$.

German patent application publication DE 10 2014 218 983 A1 describes a feedthrough element for harsh operating conditions. Here, too, the joining material comprises $B_2O_3$.

Patent application publication DE 10 2010 035 251 A9 discloses a high-temperature glass solder and its use. The glass solder comprises at least 10 wt % of BaO. However, BaO is disadvantageous since barium reacts with the Cr contained in high-temperature resistant, i.e., heat resistant steels.

Patent application publication DE 10 2015 207 285 A1 describes a glassy or at least partially crystallized sealing material which contains at least 5 mol % of $B_2O_3$.

DE 10 2011 080 352 A1 discloses a high-temperature glass solder and its use. The described high-temperature glass solder comprises between 13 wt % and 50 wt % of $Al_2O_3$, while $SiO_2$ is only optionally included in the glass solder.

U.S. patent application US 2007/0238599 A1 discloses highly crystalline sintered glass ceramics which comprise cyclosilicates. According to one embodiment, the glass ceramics of US 2007/0238599 A1 comprise between 30 wt % and 55 wt % of $SiO_2$, between 5 wt % and 40 wt % of CaO, and between 0.1 wt % and 10 wt % of $Al_2O_3$ as the necessary constituents, with a total of the oxides BaO, CaO, and SrO included in the glass ceramic amounting to between 40 wt % and 65 wt %. In other words, the glass ceramics of US 2007/0238599 A1 always contain BaO and/or SrO in addition to CaO.

U.S. patent application US 2010/0129726 A1 discloses a lead-free glass with a low $B_2O_3$ content, and with a content of the oxides $SiO_2$, MgO, CaO, SrO, BaO, ZnO, and $Al_2O_3$ in the glass of at least 97 mol %.

Glass ceramic compositions for seals are also described in US 2013/0108946 A1. The compositions either consist of $SiO_2$, $Al_2O_3$, and CaO, or of $SiO_2$, $Al_2O_3$, CaO, and SrO, or of $SiO_2$, $Al_2O_3$, and $La_2O_3$, and of further selected constituents.

Reddy et al., in RSC Advances, 2012, 2, 10955-10967, describe melilite-based glasses and glass ceramics for functional applications, for example for seals. $Bi_2O_3$ in particular acts as a crystallization agent.

International patent application WO 2017/220700 A1 describes a bond produced with an at least partially crystallized glass and a method for producing such a bond, wherein the at least partially crystallized glass includes at least one crystal phase and pores which are distributed in the at least partially crystallized glass in a structured manner.

Finally, international patent application WO 2018/066635 A1 describes a glass composition for joining or bonding. The composition contains 43 mol % to 53 mol % of $SiO_2$, 12 mol % to 33 mol % of CaO, 12 mol % to 33 mol % of MgO, and 1 mol % to 7 mol % of $La_2O_3$, and 0 mol % % to 4.5 mol % of ZnO.

All of the aforementioned prior art materials have drawbacks.

For example, the compositions according to DE 10 2012 206 266 B3, DE 10 2014 218 983 A1, and DE 10 2015 207 285 A1 necessarily comprise $B_2O_3$. The glasses described in international patent application WO 2017/220700 A1 also preferably comprise $B_2O_3$. However, $B_2O_3$ is a material which melts at relatively low temperatures and, as already described above, is therefore often used to ensure sufficient wetting of the components to be joined during melting. However, high thermal resistance of the join cannot be achieved in this way.

If joining materials contain BaO and/or SrO, parasitic contact reactions with high-temperature resistant steels will be caused, which generally include Cr.

If cyclosilicates are formed as crystalline phases, their thermal expansion coefficients of about $8*10^{-6}$/K will be too low.

Furthermore, high contents of nucleating materials such as $TiO_2$ are unfavorable, as they can lead to uncontrolled, non-controllable crystallization of the crystallizable glass. Furthermore, $TiO_2$ may even lead to the formation of low-expansion crystal phases, which would be a worst case for the applications considered here.

In the case of very high contents of constituents that are incorporated in crystal phases, as described in US 2010/0129726 A1, for example, the wetting of the material to be joined is questionable, and consequently its suitability as a joining material.

There is thus a need for crystallizable glasses, preferably with high thermal resistance such as a temperature resistance of 900° C. or even more, which wet the materials and/or components to be joined when being melted, and which preferably have a high coefficient of thermal expansion.

A further aspect of the object of the present invention therefore consists in the provision of crystallizable glasses which overcome or at least mitigate the aforementioned deficiencies of the prior art.

The disclosure according to this further aspect of the invention relates to a join, in particular a heat resistant and/or a mechanically highly resilient join, comprising an at least partially crystallized glass and a joining partner, wherein the at least partially crystallized glass includes a residual glass fraction of less than 10%, preferably less than 5%, based on the volume. The at least partially crystallized glass includes crystal aggregates. The crystal aggregates are formed by a large number of crystallites. The crystallites are preferably needle-shaped and/or platelet-shaped. Preferably, the crystallites may be distributed throughout the at least partially crystallized glass in a radiating pattern such as a spherulitic and/or fan-shaped pattern, and/or in a rod-shaped and/or platelet-shaped form.

Such a design of a join has a number of advantages.

In particular due to the low content of residual glass of less than 10 vol %, preferably even less than 5 vol %, high dimensional stability of the join is achieved.

The high dimensional stability of the join is furthermore advantageously ensured by the fact that the crystallites encompassed by the crystallized glass are aggregated. A needle-shaped and/or platelet-shaped configuration of the crystallites is particularly advantageous. The inventors have found that the needle-shaped and/or platelet-shaped formation of the crystallites in the crystal aggregates result in a mechanically stable structure of the at least partially crystallized glass. This is in particular the case if the preferably needle-shaped and/or platelet-shaped crystallites are distributed throughout the at least partially crystallized glass in a spherulitic and/or fan-shaped and/or rod-shaped and/or platelet-shaped form. The inventors assume that due to the preferably needle-shaped and/or platelet-shaped form of the crystallites and their arrangement in, for example, spherulites or in a radiating pattern or else in a rod-shaped form and randomly distributed in the at least partially crystallized glass, interlocking of the crystallites is brought about, which advantageously increases the mechanical stability of the at least partially crystallized glass, for example against shear, pressure, or tensile forces. This interlocking may also occur in a form that brings about a kind of 'house of cards' structure.

The crystallites may also be platelet-shaped, i.e., they may be distributed in the crystallized glass in the form of platelets. In a sectional view, such a form will also appear as a rod, which makes it difficult to differentiate in individual cases. In the context of the present disclosure, a platelet is understood to mean a geometric shape for which the lateral dimension in one spatial direction of a Cartesian coordinate system (thickness) is an order of magnitude smaller than the lateral dimensions (length, width) in the other two directions perpendicular to the first direction.

The disclosure furthermore relates to a join, in particular a heat resistant and/or mechanically highly resilient join, that comprises an at least partially crystallized glass and a joining partner, with the glass comprising $La_2O_3$ more than 0.3 mol % to less than 5 mol %, preferably less than or equal to 4.5 mol %, most preferably less than or equal to 4 mol %, $Nb_2O_5$ 0 mol % to 9 mol %, $Ta_2O_5$ 0 mol % to 7 mol %, with $\Sigma(A_2O_5)$ more than 0.2 mol % to 9 mol %, where A is an element which usually has the oxidation number V+ in oxides and which comprises or may comprise Nb and/or Ta or P, for example, and/or mixtures thereof.

It has been found that a robust join such as a heat resistant and/or mechanically highly resilient join can be obtained by adding the oxides $La_2O_3$, $Ta_2O_5$, and/or $Nb_2O_5$ and optionally further oxides of the composition $A_2O_5$.

Here, A is an element which in oxides usually has the oxidation number V+. It is possible that not all of the atoms "A" included in the crystallizable or at least partially crystallized glass are in the same oxidation state.

The oxides $La_2O_3$, $Nb_2O_5$, and $Ta_2O_5$ and optionally further oxides $A_2O_5$ included in the glass are also referred to as 'glass matrix-forming oxides' in the context of the present disclosure, and in the context of the present disclosure this term is understood to mean that after the thermal treatment of the crystallizable glass, i.e., when the glass is in the form of an at least partially crystallized glass, these oxides initially remain in the glass matrix. Thus, the term 'glass matrix-forming oxides' is distinguished from the more general term of 'glass-forming oxides'. In particular the oxides MgO and CaO are not glass matrix-forming oxides in the context of the present disclosure, even though CaO, for example, is a common constituent of conventional glasses such as soda-lime glasses. In the glasses according to embodiments of the present disclosure, oxides such as CaO and MgO are incorporated into the crystal phases, that means they do not remain in the glass matrix and therefore are not referred to as glass matrix-forming oxides.

However, it is entirely possible that at least some of the glass matrix-forming oxides, e.g., $La_2O_3$, are at least partially incorporated into crystal phases in the further course of ceramization. However, there will normally be a residual content of glassy phase remaining, albeit a small one, which is in particular formed by the glass matrix-forming oxides.

The embodiment of the join according to the present disclosure with the oxides $La_2O_3$ and $Nb_2O_5$ and/or $Ta_2O_5$ and optionally further $A_2O_5$ oxides within the aforementioned limits is advantageous because, in this way, the at least partially crystallized glass is particularly advantageously designed such that glass-fusing is achieved during a heat treatment for producing the join or bond. Thus, particularly advantageously, a robust bond is produced between the individual components of the join in this way, and a robust bond is in particular facilitated between the at least partially crystallized glass and the joining partner. However, the limitations for the glass matrix-forming oxides within the aforementioned limits advantageously ensure that, at the same time, high temperature stability and/or high mechanical strength of the join is provided.

In the context of the present disclosure, the following definitions shall apply:

In the context of the present disclosure, crystallizable glass is understood to be a glass that is accessible to crystallization, in particular to controlled or at least controllable crystallization. Here, controlled crystallization is understood to mean that, by a selective heat treatment, the crystallizable glass can be converted into a state in which the glass is at least partially crystallized and in which the crystallographic composition of the at least partially crystallized glass and/or its microstructure, i.e., the spatial arrangement and/or size of the crystals and/or crystallites included in the at least partially crystallized glass is preferably adjusted in a targeted manner. Preferably, the controlled crystallization allows to obtain a microstructure in which, for example, the crystallites have a substantially uniform size, for example in a single-digit micrometer range, so, for example, all crystallites have an equivalent diameter of approximately 1 μm to 3 μm.

Other microstructures with larger or smaller crystallites are likewise possible, as a matter of course.

If the at least partially crystallized glass comprises a plurality of different crystal phases, it is also possible that the average size of the crystals or crystallites within one crystal phase is relatively similar, but large differences with regard to the crystallite size exist between the individual crystal phases.

What can be considered as an opposite to the preferably controlled or controllable crystallization is spontaneous crystallization of a glass, which brings about unexpected crystal phases, often also undesired crystal phases, and which in particular even may bring about complete devitrification.

In the context of the present disclosure, a crystal aggregate or crystal association is understood to mean an intergrowth of at least two crystals or crystallites. The crystals or crystallites may in particular exhibit random intergrowth. This means that the individual crystallites or crystals of an aggregate do not need to be intergrown along a preferred direction or along a specific crystal plane.

Needle-shaped form of a crystal or a crystallite is understood to mean that the crystal or crystallite exhibits a direction in which its dimension is at least one order of magnitude greater than the dimensions in the two other spatial directions. In other words, a crystal or crystallite with a needle-shaped form may be needle-shaped or rod-shaped or in the form of a prism, in which case the lateral dimensions of the prismatic base are at least one order of magnitude smaller than the length of the crystal or crystallite. Such crystals or crystallites are also referred to as being prismatic.

The crystallites may also be platelet-shaped, i.e., may be distributed in the crystallized glass in the form of small platelets. In a sectional view, such a form will also appear as a rod, which makes it difficult to differentiate in individual cases. In the context of the present disclosure, platelet refers to a geometric shape which has a lateral dimension in one spatial direction of a Cartesian coordinate system (the thickness), which is an order of magnitude smaller than the lateral dimensions (length, width) in the other two directions perpendicular to the first direction.

In the context of the present disclosure, radiating pattern of crystals or crystallites is understood to mean that needle-like or platelet-shaped crystals such as needle-shaped or prismatic crystals or crystallites are arranged around a center so that one end thereof points towards a common point and the other end points radially outward in different spatial directions. For example, the ends pointing towards the center may touch each other at the central point. However, this is not necessary. One example of such a formation of crystal aggregates pointing radially outward from a center is a spherulitic formation of a crystal aggregate. Such a spherulitic formation is an approximately spherical or ellipsoidal configuration of the crystal aggregate and may approximately have the shape of a circle in a two-dimensional representation. In practice, however, the intergrowth of crystals and crystal aggregates in a microstructure will often lead to a deviation from the ideal spherical or circular shape of a spherulite. The crystals or crystallites forming the spherulite may in particular have different lengths and/or thicknesses.

Another embodiment of a radiating arrangement is a fan-shaped formation in a two-dimensional sectional view. For example, it is possible that the crystals or crystallites cannot form in a specific spatial direction within the microstructure. In this case, the crystallites or crystals will also extend from a center outwards, but only within a certain solid angle.

A distributed rod-shaped or platelet-shaped arrangement is understood to mean that the individual crystals or crystallites do not extend outward in different spatial directions from a common center, but are arranged randomly, for example without a particular preferred direction. The crystallites or crystals may in particular be interlocked with one another. Such a structure may, for example, be compared to the structure of a 'house of cards', in which the individual platelets are engaging on one another (like the cards in a house of cards) and form a stable structure.

In the context of the present disclosure, crystallization nucleus refers to a starting point for crystallization. The crystallization nucleus favors the accumulation of atoms to build a crystalline lattice, for example thermodynamically or kinetically. A crystallization nucleus may in particular be a lattice defect and/or an assembly of atoms. Often, boundary faces may be the starting points for crystallization or include such starting points for crystallization.

According to one embodiment of the join, the crystallites at least partially comprise crystallization nuclei at the grain boundaries, and/or the grain boundaries of the crystallites, at least in part, have enrichments in lanthanum disposed thereon, in particular comprising lanthanum compounds.

Such a configuration of a join is advantageous in order to facilitate the formation of a particularly strong bond between at least partially crystallized glass and the joining partner. If the crystallites, at least in part, have crystallization nuclei at the grain boundaries, this promotes the formation of the microstructure of the at least partially crystallized glass comprising crystal aggregates with, for example, a radiating or a distributed rod-shaped or platelet-shaped arrangement, for example in a kind of house of cards structure.

This is also the case if enrichments of lanthanum, in particular comprising lanthanum compounds, are provided at least on part of the grain boundaries of the crystallites. The inventors assume that enrichments of lanthanum, for example of lanthanum compounds, can act as effective crystallization nuclei.

According to a further embodiment of the join, the difference, as an absolute value, between thermal expansion coefficients of the joining partner and the at least partially crystallized glass is $5*10^{-6}$/K or less, preferably $3*10^{-6}$/K or less, and most preferably $1*10^{-6}$/K or less.

Such an embodiment of the join, in particular the matching of the thermal expansion coefficients of the glass and the joining partner, has the advantageous effect that the heat resistance and/or mechanical durability of the so obtained join can be further improved in this way.

The join can be exposed to high operating temperatures. In particular operating temperatures of 1000° C. and more are possible. It is assumed that the presence and the described structure of the crystal aggregates stabilize the material mechanically, for example through the interlocking and quasi intermeshing of the crystal aggregates. If a residual glass phase is included, it may also be stabilized by the crystal aggregates and/or their structure, even if the residual glass phase should sort of soften due to the heat impact.

Advantageously, the join is furthermore mechanically stable, in particular against vibration loads. This is also measured as a function of temperature in shock and vibration tests in compliance with ISO 16750-3 (version 2007-08-01). It is assumed that the crystal aggregates suppress the propagation of initial cracks in the material, thus avoiding failure of a component that includes the join, even if defects should arise locally.

Thus, according to one embodiment of the disclosure, the join withstands operating temperatures of at least 1000° C., and the join is preferably shock-resistant and vibration-resistant, measured according to ISO 16750-3.

In other words, the crystal aggregates seem to counteract a displacement of volume elements of the at least partially crystallized glass during operation. This may be visualized by considering any two adjacent volume elements that include crystal aggregates. During operation, under mechanical loads, forces can act on the volume elements, for example a shear force which tends to displace the volume elements relative to one another. If the crystal aggregates have a suitable structure, in particular the structure mentioned above, they can interlock and thus suppress the displacement of the volume elements relative to each other purely mechanically.

Thus, according to yet another embodiment of the join, the crystal aggregates counteract the displacement of volume elements of the at least partially crystallized glass relative to one another during operation.

Advantageously, the measures as mentioned may in particular also be effective in combination.

The join is preferably implemented in a way so that the surface of the at least partially crystallized glass has no meniscus or a neutral meniscus.

Here, a form of the surface without meniscus is understood to mean that the surface is not curved. A curved form of the surface of the at least partially crystallized glass may result, for example, when the glass is heated to produce the join and at least partially melts (glass-fusing) and thereby wets the joining partner particularly well so that, as a result, the capillary forces at the interface to the joining partner cause the glass to rise. In this case the meniscus will be concave. In the case of only slight wetting, on the other hand, for example if a glass is extremely highly viscous, a convex meniscus may develop. Optimally, however, the join is designed such that the surface of the at least partially crystallized glass exhibits no meniscus, i.e., is not curved upwards nor downwards. This is also referred to as a neutral meniscus.

According to a further embodiment of the join, an at least predominantly amorphous glass layer is provided in the transition zone between the surface of the joining partner and the surface of the at least partially crystallized glass, which glass layer preferably includes less than 10 pores per $cm^3$ and/or preferably has a thickness of 5 μm or less, more preferably of 2 μm or less, and most preferably of 1 μm or less.

Such an embodiment of the join is advantageous because a particularly strong bond can be achieved in this way. In particular, low porosity at the interface between the at least partially crystallized glass and the joining partner advantageously results in a further increase in the mechanical and/or thermal resistance of the bond. This is because pores at the interface or near the interface might be starting points for mechanical failure, in particular when the join is exposed to high temperatures.

The only small thickness of an amorphous glass layer at the interface also advantageously promotes the formation of a join that can withstand high thermal and/or mechanical loads, for example. The formation of the glass layer means that a chemical bond exists between the joining partner and the glass. However, it is particularly advantageous according to the present disclosure, if the at least partially crystallized glass has a residual glass content of less than 10 vol %, preferably less than 5 vol %. In other words, the at least partially crystallized glass should only include a small fraction of residual glass. This is because the thermal and/or mechanical stability of the join is in particular a result of the formation of the crystalline phase or crystalline phases. Therefore, advantageously, high thermal and/or mechanical resistance is in particular ensured if the amorphous glass layer has a small thickness of not more than 5 μm or less, preferably 2 μm or less, and most preferably 1 μm or less.

According to one embodiment of the join, the joining partner comprises a metal, in particular a metal from the group of steels, such as normal steels, high-grade steels, stainless steels, and heat-resistant ferritic steels which are also known under the brand name Thermax, e.g., Thermax 4016, Thermax 4742, or Thermax 4762, or Crofer 22 APU, or CroFer 22 H, or NiFe-based materials, e.g., NiFe45, NiFe47, or nickel-plated pins, or known under the brand name Inconel, e.g., Inconel 718 or X-750, or steels such as known under the designations CF25, Alloy 600, Alloy 601, Alloy 625, Alloy 690, SUS310S, SUS430, SUH446, or SUS316, or austenitic steels such as 1.4762, 1.4828, or 1.4841, Kanthal heating wire, or a heat-resistant ceramic compound, e.g., forsterite, an aluminum oxide-based ceramic or a zirconium oxide-based ceramic, for example a ceramic comprising Y-stabilized zirconia.

According to one embodiment, the join exhibits a helium leak rate of less than $10^{-8}$ mbar*l/s and/or, according to one embodiment, comprises an at least partially crystallized glass, which has a Young's modulus between 80 GPa and 200 GPa, preferably a Young's modulus between 100 GPa and 125 GPa. Such an embodiment is advantageous because, although sufficient mechanical rigidity is achieved in this way, such a bond is more elastic compared to conventional ceramics, for example. This is advantageous in the case of temperature cycling loads and therefore advantageously results in a particularly temperature-stable join.

The disclosure furthermore relates to a crystallizable or at least partially crystallized glass, comprising $La_2O_3$ more than 0.3 mol % to less than 5 mol %, preferably less than or equal to 4.5 mol %, most preferably less than or equal to 4 mol %;

$Nb_2O_5$ 0 mol % to 9 mol %;

$Ta_2O_5$ 0 mol % to 7 mol %;

with $\Sigma(A_2O_5)$ more than 0.2 mol % to 9 mol %, where A is an element which usually has the oxidation number V+ in oxides, and which may comprise Nb and/or Ta or P, for example, and/or mixtures thereof.

It has been found that a robust bond between the glass and the joining partners can be achieved by adding a sufficient amount, i.e., within the limits mentioned above, of the oxides $La_2O_3$, $Ta_2O_5$, and/or $Nb_2O_5$ and optionally of further oxides of the composition $A_2O_5$.

Here, A is an element which in oxides usually has the oxidation number V+. Hence, it is possible that not all of the atoms "A" included in the crystallizable or at least partially crystallized glass are in the same oxidation state.

In the context of the present disclosure, the oxides $La_2O_3$, $Nb_2O_5$, and $Ta_2O_5$ and optionally further oxides $A_2O_5$ included in the glass are also referred to as 'glass matrix-forming oxides', and in the context of the present disclosure this term is understood to mean that after the thermal treatment of the crystallizable glass, i.e., when the glass is in the form of an at least partially crystallized glass, these oxides initially remain in the glass matrix. Thus, the term 'glass matrix-forming oxides' is distinguished from the more general term of 'glass-forming oxides'. In particular, the oxides MgO and CaO are not glass matrix-forming oxides in the sense of the present disclosure, even though CaO, for example, is a common constituent of conventional glasses such as soda-lime glasses. In the glasses according to embodiments of the present disclosure, oxides such as CaO and MgO are incorporated into the crystal phases, that means they explicitly do not remain in the glass matrix and therefore are not glass matrix-forming oxides.

However, it is entirely possible that one or more of the glass matrix-forming oxides, such as $La_2O_3$, are at least partially incorporated into crystal phases in the further course of ceramization. However, a residual content of glassy phase will normally remain, which is in particular formed by the so-called glass matrix-forming oxides.

An addition of the constituents $La_2O_3$, $Ta_2O_5$, and/or $Nb_2O_5$ and optionally of further oxides $A_2O_5$ initially contributes to the high glass stability of the starting material. As mentioned above, these oxides are those oxides which remain in the glass matrix surrounding the crystallites and/or crystals, at least initially, after the heat treatment, i.e., a thermal treatment by which the crystallizable glass can be converted into an at least partially crystallized glass.

The inventors assume that these constituents are converted to and/or incorporated into crystalline structural constituents only later in the thermal treatment, if at all. In particular, at least the constituent $La_2O_3$ may be at least partially incorporated into crystalline phases.

Surprisingly, it has been found that it is explicitly the glassy component of the microstructure, which may in particular include the oxides listed above, such as $La_2O_3$, $Ta_2O_5$, and/or $Nb_2O_5$ and optionally further oxides $A_2O_5$, which is capable of ensuring a firm bond to the joining partners, i.e., the materials and/or components to be joined, and still allows for high dimensional stability of the resulting bond at high temperatures, such as temperatures of 900° C. or even of 950° C. or 1000° C. or more.

In the context of the present disclosure, a material and/or a component is referred to as heat resistant or high-temperature stable, if it can be used at a temperature of 900° C. and more, preferably 950° C. and more, and most preferably 1000° C. and more, in particular if it can be used at a temperature of 900° C. or more, preferably 950° C. or more, and most preferably 1000° C. and more over 100 hours or more, preferably over 500 hours and more, and most preferably over 1000 hours. The material and/or the component can be designed to be in particular resistant against deformation at these temperatures over the time durations mentioned.

This high dimensional stability, in turn, is attributed to a relatively early start of crystallization. However, because of the glass matrix, the latter does not prevent a firm bond of the joining partners. This is particularly surprising, since hitherto it has been assumed that a robust and tight bond can only be obtained if crystallization does not occur until sintering has been completed, see, e.g., Tulyaganov et al., Journal of Power Sources 242 (2013), 486-502.

Further constituents that may be included in the glass and at least partially remain in the glass matrix after the heat treatment are $Bi_2O_3$ and/or $P_2O_5$. However, these constituents are disadvantageous with regard to the high-temperature stability of the glass and of the join made with this glass, which is addressed here. Therefore, according to one embodiment, the glass is advantageously free of oxides of Bi and/or P, except for unavoidable traces.

In the context of the present disclosure, unavoidable traces is understood to mean contents of the respective constituent of 500 ppm or less. The unit "ppm" is based on weight.

According to yet another embodiment, the glass is free of oxides of alkalis and/or of boron, except for unavoidable traces. In particular, this means that according to a particularly preferred embodiment of the invention the glass comprises not more than 500 ppm of $B_2O_3$. The absence of alkali oxides and/or of $B_2O_3$ in the glass according to this embodiment is advantageous, since the aforementioned compounds reduce the temperature resistance of the crystallizable or at least partially crystallized glass. Moreover, these compounds, e.g., certain alkalis, could possibly cause the formation of low expansion crystal phases which are undesirable for the applications addressed here. Furthermore, alkali contents are disadvantageous because they lower the electrical resistance.

According to one embodiment, the glass comprises an oxide RO, with $\Sigma(RO)$ less than or equal to 55 mol %, where R is an element which in oxides usually has the oxidation number II+ and which in particular comprises Ca, Mg, or Zn, and/or mixtures thereof.

In other words, RO comprises alkaline earth oxides and ZnO. According to a preferred embodiment of the disclosure, the glass is free of the alkaline earth oxides BaO and/or SrO, except for unavoidable traces, in order to avoid parasitic contact reactions of the glass with chromium-containing joining materials such as chromium-containing steels.

According to a further embodiment, the glass comprises $SiO_2$ 30 mol % to 40 mol %, $Al_2O_3$ 3 mol % to 12 mol %, CaO 32 mol % to 46 mol %, MgO 5 mol % to 15 mol %, ZnO 0 mol % to 10 mol %, and optionally ZrO$_2$ 0 mol % to 4 mol %, preferably at most 3 mol %, and/or TiO$_2$ 0 mol % to 4 mol %, preferably at most 3 mol %, and/or MnO$_2$ 0 mol % to 5 mol %.

According to one embodiment, TiO$_2$, ZrO$_2$, and/or MnO$_2$ may optionally be included in the glass. However, the content of these constituents in the glass is limited. In particular TiO$_2$ and ZrO$_2$, which are known to be nucleating agents, are not required as nucleating agents in the crystallizable glass. Moreover, their presence may be disruptive, since undesirable low-expansion crystal phases might be formed in a worst case for the present application.

According to a further embodiment, the CaO content of the glass is between at least 35 mol % and at most 46 mol %, preferably between at least 35 mol % and less than 43.5 mol %, and/or the MgO content of the glass is between 5 mol % and less than 13 mol %.

The limited contents of CaO and/or MgO in the glass according to one embodiment are based on the fact that the stability of the crystallizable glass against spontaneous crystallization is further enhanced in this way. CaO and MgO are compounds that are incorporated into the crystal phases which form under the heat treatment of the crystallizable glass. As stated above, it is of particular importance for the addressed applications that crystal phases with a high coefficient of thermal expansion are obtained. In order to promote that especially the desired crystal phases with a high coefficient of thermal expansion are predominantly obtained, the CaO and MgO contents of the glass are therefore preferably further limited, as explained above. This limitation in particular intends to inhibit, at least as far as possible, or to even completely prevent the formation of wollastonite, enstatite, or diopside, and of solid solutions of these crystalline phases.

According to a further embodiment, the glass is provided in the form of a crystallizable glass and has a transition temperature of more than 720° C.

The transition temperature of a glass is an important characteristic parameter that reflects both the processing properties of this glass and its thermal resistance. More particularly, a high transition temperature of the glass is associated with a high dimensional stability of the glass.

Therefore, according to one embodiment, the crystallizable glass preferably exhibits particularly high dimensional stability, which is reflected in the specified high transformation or glass transition temperature T$_g$ of 720° C. or more.

According to a further embodiment, the coefficient of linear thermal expansion of the crystallizable glass is greater than 8*10$^{-6}$/K in a temperature range from 20° C. to 300° C., and preferably is greater than 9*10$^{-6}$/K in a temperature range from 20° C. to 700° C. In this way, with the crystallizable glass, a good adaptation of the coefficient of linear thermal expansion of the glassy material is advantageously possible already before the end of the thermal treatment for producing the preferably hermetically sealing bond to the materials to be joined, such as highly refractory materials such as Y-stabilized ZrO$_2$ and/or alloys.

The transition temperature T$_g$ is determined by the intersection of the tangents to the two branches of the expansion curve when measured at a heating rate of 5 K/min. This corresponds to a measurement in compliance with ISO 7884-8 or DIN 52324.

The softening point of a glass, also abbreviated "SP" in the context of the present temperature, indicates the temperature at which the viscosity of the glass has a value of 10$^{7.6}$ dPa·s.

In the context of the present disclosure, the expansion coefficient is specified as the coefficient of linear thermal expansion. If the specification relates to the coefficient of linear thermal expansion of a crystallizable glass, this is the nominal coefficient of mean linear thermal expansion according to ISO 7991, which is determined in a static measurement (using a push rod dilatometer). The coefficient of linear thermal expansion of an at least partially crystallized glass is determined dilatometrically.

In the context of the present disclosure, the coefficient of linear thermal expansion is also designated by a. For example, α(20-700) or α$_{20-700}$ indicates the coefficient of linear thermal expansion in the temperature range from 20° C. to 700° C.

According to yet another embodiment of the disclosure, the glass is provided in the form of an at least partially crystallized glass and has a coefficient of linear thermal expansion of more than 9*10$^{-6}$/K, preferably more than 10*10$^{-6}$/K in the temperature range from 20° C. to 700° C., and, most preferably, the coefficient of linear thermal expansion of the at least partially crystallized glass is greater than 9*10$^{-6}$/K, preferably greater than 9.5*10$^{-6}$/K in the temperature range from 20° C. to 1000° C.

According to embodiments of the disclosure, the glass is designed such that not only preferably hermetically sealing and/or electrically insulating bonds can be produced. According to embodiments, such preferably hermetically sealing and/or electrically insulating bonds can in particular also be produced so as to consistently guarantee sufficient electrical insulation even at high temperatures.

Such bonds, for example metal-glass bonds, are referred to as being fluid-tight, if such a bond provides sealing, which in the present case means that it is tight against the escape or passage of fluid media and is preferably substantially completely (hermetically) tight. The tightness can be determined by a leak test, usually using a helium leak tester. Helium leak rates of less than 1*10$^{-8}$ mbar*l/s at room temperature indicate that a substantially completely hermetic seal is provided. This measurement can preferably be conducted with an applied pressure of 1 bar.

According to these embodiments, the glass is provided in the form of crystallizable glass, and the temperature, t$_{K100}$, for an electrical resistivity of 10$^8$ Ω·cm, preferably determined according to DIN 52326, is 500° C. or more.

According to one embodiment, the crystallizable or at least partially crystallized glass comprises in particular SiO$_2$ and CaO and MgO and Al$_2$O$_3$, and optionally ZnO.

The SiO$_2$—Al$_2$O$_3$—CaO—MgO system allows to obtain crystal phases with a high coefficient of thermal expansion. This includes, for example, solid solutions from the family of CaO-rich calcium-magnesium silicates, such as åkermanite and/or merwinite, which in the form of solid solutions with Al$_2$O$_3$, for example, also form gehlenite and/or augite. If the glass also includes ZnO, hardystonite can furthermore also develop as a solid solution.

According to one embodiment, the glass is in the form of at least partially crystallized glass and includes crystallites of preferably CaO-rich calcium-magnesium silicates, in particular of CaO-rich calcium-magnesium island silicates and/or group silicates. Island silicates are silicates in which the SiO$_4$ tetrahedra included in silicates are isolated, i.e., are not linked to one another. Group silicates are silicates in which two SiO$_4$ tetrahedra are linked to one another via a common bridging oxygen, so that $Si_2O_7$ groups are provided as a silicate structural unit. Preferably, the at least partially crystallized glass may comprise merwinite, $Ca_3Mg(SiO_4)_2$, as an island silicate, and/or a solid solution with a merwinite structure. Furthermore, as an alternative or in addition, the at least partially crystallized glass may comprise crystal phases with a melilite structure as a group silicate, such as åkermanite, $Ca_2MgSi_2O_7$, or gehlenite, $Ca_2Al[AlSiO_7]$, and/or solid solutions thereof. Furthermore, according to one embodiment, the at least partially crystallized glass may also comprise crystal phases with an augite structure.

If reference is made to a solid solution in the context of the present disclosure, this refers to a crystal which does not correspond to a stoichiometric compound. For example, when referring to an 'åkermanite solid solution', this is understood to mean a crystal which does not have the stoichiometric composition $Ca_2MgSi_2O_7$. For example, it is possible that the solid solution comprises more Ca than according to the stoichiometric composition, or that Zn was additionally incorporated instead of Ca. However, the solid solution crystallizes in a crystal structure which largely corresponds to that of åkermanite, i.e., apart from small deviations with regard to the lattice constant, for example.

According to one embodiment, the glass is provided in the form of an at least partially crystallized glass and comprises crystallites of preferably CaO-rich calcium-magnesium silicates, in particular CaO-rich calcium-magnesium island silicates and/or group silicates, such as merwinite and/or a solid solution with a merwinite structure, and alternatively or additionally a crystal phase with a melilite structure, such as åkermanite $Ca_2MgSi_2O_7$ and/or gehlenite $Ca_2Al[AlSiO_7]$ and/or solid solutions thereof, and/or crystal phases with an augite structure.

The present disclosure also relates to a join comprising an at least partially crystallized glass, wherein the glass is an at least partially crystallized glass according to embodiments of the present disclosure or is made or can be produced from a crystallizable glass according to embodiments of the present disclosure.

In the context of the present disclosure, joining partner is understood to mean a material or a component which is or is intended to be assembled or joined with another material or component to form a preferably hermetically sealed component. If a plurality of joining partners are provided, which are to be joined, they may have the same or a different composition.

In the context of the present disclosure, the bond is also referred to as a join compound or a join.

The disclosure also relates to a product. The product is in particular a retaining component and/or an insulating component and/or an additive structure, comprising an at least partially crystallized glass according to embodiments of the present disclosure.

The product is preferably producible from a sintered body comprising a crystallizable glass according to embodiments of the present disclosure. The sintered body preferably comprises the crystallizable glass in the form of a glass powder. Most preferably, the glass powder comprises powder grains with grain surfaces.

Furthermore, the disclosure relates to the use of a join according to embodiments of the present disclosure. The join can in particular be used in a sensor such as an exhaust gas sensor, for example in an exhaust gas system of an automobile, in a pressure sensor, in a particle sensor such as a soot particle sensor, and/or in a temperature sensor and/or an $NO_x$ sensor and/or an oxygen sensor, and/or in a feedthrough of a compressor and/or an e-compressor, and/or as an electrical power feedthrough of an exhaust gas component, and/or in a fuel cell, and/or in a feedthrough for a chemical reactor.

EXAMPLES

The presently disclosed crystallizable or at least partially crystallized glass and its use will be explained in more detail below by way of examples.

The following table shows exemplary compositions of crystallizable or at least partially crystallized glasses. The compositions are given in mol % in each case. The characteristic temperatures are the temperatures usually used to describe the melting behavior of ashes, such as softening temperature (abbreviated: softening), sintering temperature (abbreviated: sintering), spherical temperature (abbreviated spherical), hemispherical temperature (abbreviated: hemispherical) and flow temperature, as determined using a hot stage microscope (abbreviated HSM). These temperatures were determined according to or based on DIN 51730. The thermal expansion coefficient α is given in units of $10^{-6}/K$ in each case.

TABLE 1

Composition of glasses according to embodiments

| | Example # | | | | | | | |
|---|---|---|---|---|---|---|---|---|
| | 1 | 2 | 3 | 4 | 5 | 6 | 7 | 8 |
| $SiO_2$ | 36 | 34 | 36 | 34 | 34 | 38 | 35 | 35 |
| $Al_2O_3$ | 7 | 6 | 7 | 6 | 9 | 5 | 7.7 | 7 |
| $B_2O_3$ | | | | | | | | |
| $TiO_2$ | | | | | | | | |
| $MnO_2$ | | | | | | | | |
| $ZrO_2$ | 2 | | | | | | | |
| $P_2O_5$ | | | | | | | | |
| $Bi_2O_3$ | | | | | | | | |
| $La_2O_3$ | 2 | 2 | 2 | 4 | 1 | 2 | 2.6 | 2.2 |
| $Nb_2O_5$ | 6 | | 3 | | 2 | 1 | 0.2 | 0.6 |
| $Ta_2O_5$ | | 4 | | 2 | | | 0.3 | 0.6 |
| $Y_2O_3$ | | | | | | | | |
| $R_2O$ | | | | | | | | |

TABLE 1-continued

Composition of glasses according to embodiments

|  |  |  |  |  |  |  |  |  |
|---|---|---|---|---|---|---|---|---|
| ZnO |  | 6 |  | 4 |  | 2 | 3 | 3.3 |
| MgO | 9 | 10 | 10 | 10 | 11 | 10 | 12.2 | 10.3 |
| CaO | 38 | 38 | 42 | 40 | 43 | 42 | 39 | 41 |
| SrO |  |  |  |  |  |  |  |  |
| BaO |  |  |  |  |  |  |  |  |
| Total | 100 | 100 | 100 | 100 | 100 | 100 | 100 | 100 |
| Σ (RO) | 47 | 54 | 52 | 54 | 54 | 54 | 54.2 | 54.6 |
| CaO + MgO | 47 | 48 | 52 | 50 | 54 | 52 | 51.2 | 51.3 |
| Σ ($R_2O_3 + A_2O_5$) | 8 | 6 | 5 | 6 | 3 | 3 | 3.1 | 3.4 |
| Σ ($A_2O_5$) | 6 | 4 | 3 | 2 | 2 | 1 | 0.5 | 1.2 |
| CaO/MgO | 4.22 | 3.80 | 4.20 | 4.00 | 3.91 | 4.20 | 3.20 | 3.98 |

Temperatures [° C.]

|  |  |  |  |  |  |  |  |  |
|---|---|---|---|---|---|---|---|---|
| HSM: sintering |  | 767 | 772 | 772 | 770 | 762 | 765 | 770 |
| HSM: softening |  | 890 | 925 |  | 922 | 811 |  |  |
| spherical |  |  | 1282 | 1259 |  | 1304 |  |  |
| hemispherical | 1198 | 1289 | 1265 |  | 1320 | 1298 | 1340 | 1320 |

Crystallizable glass

|  |  |  |  |  |  |  |  |  |
|---|---|---|---|---|---|---|---|---|
| α (20; 300° C.) | 8.28 | 8.33 | 8.8 | 8.81 | 8.46 | 8.72 | 8.47 | 8.64 |
| α (20; 700° C.) | 9.24 | 9.43 | 9.81 | 9.8 | 9.42 | 9.88 | 9.63 | 9.65 |
| $T_g$ [° C.] | 752 | 743 | 754 | 737 | 753 | 741 | 739 | 734 |
| SP [° C.] |  |  | 877 |  | 883 | 873 | 878 | 875 |
| Density [g/cm³] | 3.43 | 3.77 | 3.27 | 3.64 | 3.13 | 3.22 | 3.28 | 3.32 |
| $t_{K100}$ [° C.] | 572 | 596 | 588 |  | 604 | 593 | 611 | 606 |
| Young's modulus [GPa] |  |  | 107 |  | 107 | 105 | 107 | 106 |

Crystallized glass
Crystallization occurred @ 1000° C./20 min

|  |  |  |  |  |  |  |  |  |
|---|---|---|---|---|---|---|---|---|
| α (20; 700° C.) | 8.7 | 9.3 | 10.9 | 9.9 | 9.3 | 9.6 | 9.96 | 9.3 |
| α (20; 1000° C.) | 9.4 | 9.55 | 11.1 | 10.15 | 9.6 | 9.66 | 10.23 | 9.7 |

Crystallization occurred @ 1040° C./200 min

|  |  |  |  |  |  |  |  |  |
|---|---|---|---|---|---|---|---|---|
| α (20; 700° C.) | 10.53 | 9.2 | 10.3 | 9.7 | 9.7 | 10.2 | 9.25 | 10.15 |
| α (20; 1000° C.) | 10.25 | 9.55 | 10.75 | 10 | 9.65 | 10.35 | 9.15 | 10.2 |

| | Example # | | | | | | | |
|---|---|---|---|---|---|---|---|---|
| | 9 | 10 | 11 | 12 | 13 | 14 | 15 | 16 |
| SiO$_2$ | 33.2 | 34.5 | 35 | 36 | 35.3 | 36.8 | 36.4 | 35 |
| Al$_2$O$_3$ | 10 | 6.6 | 6 | 8 | 7.7 | 6.6 | 8 | 6.6 |
| B$_2$O$_3$ |  |  |  |  |  |  |  |  |
| TiO$_2$ |  |  |  | 2 |  |  |  |  |
| MnO$_2$ |  |  | 2 |  |  |  |  |  |
| ZrO$_2$ |  |  |  |  | 1.2 | 0.3 |  |  |
| P$_2$O$_5$ |  |  |  |  |  |  |  |  |
| Bi$_2$O$_3$ |  |  |  |  |  |  |  |  |
| La$_2$O$_3$ | 1.7 | 2.2 | 3 | 2.4 | 3 | 2.6 | 2.8 | 2.4 |
| Nb$_2$O$_5$ | 1.2 | 1.6 | 2 |  | 0.8 | 0.3 | 0.6 | 0.6 |
| Ta$_2$O$_5$ | 0.5 | 0.1 |  | 0.3 |  |  | 0.4 | 0.4 |
| Y$_2$O$_3$ |  |  |  |  |  |  |  |  |
| R$_2$O |  |  |  |  |  |  |  |  |
| ZnO | 3 | 2 |  | 1 | 1 |  | 1.4 | 6.4 |
| MgO | 8.2 | 10 | 10 | 11.8 | 10 | 10.8 | 11.8 | 10.6 |
| CaO | 42.2 | 43 | 42 | 38.5 | 41 | 42.6 | 38.6 | 38 |
| SrO |  |  |  |  |  |  |  |  |
| BaO |  |  |  |  |  |  |  |  |
| Total | 100 | 100 | 100 | 100 | 100 | 100 | 100 | 100 |
| Σ (RO) | 53.4 | 55 | 52 | 51.3 | 52 | 53.4 | 51.8 | 55 |
| CaO + MgO | 50.4 | 53 | 52 | 50.3 | 51 | 53.4 | 50.4 | 48.6 |
| Σ (R$_2$O$_3$ + A$_2$O$_5$) | 3.4 | 3.9 | 5 | 2.7 | 3.8 | 2.9 | 3.8 | 3.4 |
| Σ (A$_2$O$_5$) | 1.7 | 1.7 | 2 | 0.3 | 0.8 | 0.3 | 1 | 1 |
| CaO/MgO | 5.15 | 4.30 | 4.20 | 3.26 | 4.10 | 3.94 | 3.27 | 3.58 |

Temperatures [° C.]

|  |  |  |  |  |  |  |  |  |
|---|---|---|---|---|---|---|---|---|
| HSM: sintering | 770 | 762 | 760 | 761 |  |  | 786 |  |
| HSM: softening |  |  |  |  |  |  | 904 |  |
| spherical | 1308 | 1270 | 1313 | 1290 |  |  | 1309 |  |
| hemispherical | 1320 | 1279 | 1318 | 1300 |  |  | 1316 |  |

Crystallizable glass

|  |  |  |  |  |  |  |  |  |
|---|---|---|---|---|---|---|---|---|
| α (20; 300° C.) | 8.4 | 9.05 | 8.94 | 8.5 | 8.7 | 8.9 | 8.53 | 8.6 |
| α (20; 700° C.) | 9.4 | 10 | 10.04 | 9.53 | 9.62 | 9.84 | 9.57 | 9.8 |
| $T_g$ [° C.] | 749 | 749 | 747 | 746 | 754 | 757 | 747 | 726 |

TABLE 1-continued

Composition of glasses according to embodiments

| | | | | | | | | |
|---|---|---|---|---|---|---|---|---|
| SP [° C.] | 880 | 875 | 880 | 878 | 891 | 900 | 884 | 862 |
| $V_a$ [° C.] | | | | | | | 1059 | |
| Density [g/cm³] | 3.26 | 3.28 | 3.35 | 3.23 | 3.29 | 3.2 | 3.29 | 3.37 |
| $t_{\kappa 100}$ [° C.] | 616 | 598 | 590 | 606 | 607 | 609 | 609 | 607 |
| Young's modulus [GPa] | 106 | 106 | 107 | 107 | | | | |

Crystallized glass
Crystallization occurred @ 1000° C./20 min

| | | | | | | | | |
|---|---|---|---|---|---|---|---|---|
| α (20; 700° C.) | 10.6 | 10.75 | | 10.55 | | 10.7 | 10.0 | 10.2 |
| α (20; 1000° C.) | 11.1 | 11.1 | | 11.1 | | 11 | 10.3 | 10.2 |

Crystallization occurred @ 1020° C./20 min

| | | | | | | | | |
|---|---|---|---|---|---|---|---|---|
| α (20; 700° C.) | | | | | | | 10.15 | |
| α (20; 1000° C.) | | | | | | | 10.1 | |

Crystallization occurred @ 1040° C./200 min

| | | | | | | | | |
|---|---|---|---|---|---|---|---|---|
| α (20; 700° C.) | 9.5 | 10 | 9.55 | | 10.3 | 10.4 | | 9.4 |
| α (20; 1000° C.) | 9.65 | 9.7 | 9.7 | | 10.1 | 10.3 | | 9.6 |

| | Example # | |
|---|---|---|
| | 17 | 18 |
| $SiO_2$ | 35.6 | 35.5 |
| $Al_2O_3$ | 8 | 6 |
| $B_2O_3$ | | |
| $TiO_2$ | | |
| $MnO_2$ | | |
| $ZrO_2$ | | |
| $P_2O_5$ | | |
| $Bi_2O_3$ | | |
| $La_2O_3$ | 3.2 | 3.6 |
| $Nb_2O_5$ | 0.75 | 0.8 |
| $Ta_2O_5$ | 0.45 | 0.3 |
| $Y_2O_3$ | | |
| $R_2O$ | | |
| ZnO | 2 | 4 |
| MgO | 12 | 12.8 |
| CaO | 38 | 37 |
| SrO | | |
| BaO | | |
| Total | 100 | 100 |
| Σ (RO) | 52 | 53.8 |
| CaO + MgO | 50 | 49.8 |
| Σ ($R_2O_3 + A_2O_5$) | 4.4 | 4.7 |
| Σ ($A_2O_5$) | 1.2 | 1.1 |
| CaO/MgO | 3.178 | |

Temperatures [° C.]

| | | |
|---|---|---|
| HSM: sintering | 786 | |
| HSM: softening spherical | | |
| hemispherical | 1319 | |

Crystallizable glass

| | | |
|---|---|---|
| α (20; 300° C.) | 8.5 | 8.69 |
| α (20; 700° C.) | 9.58 | 9.88 |
| $T_g$ [° C.] | 746 | 736 |
| SP [° C.] | 882 | 870 |
| Density [g/cm³] | 3.35 | 3.43 |
| $t_{\kappa 100}$ [° C.] | | |
| Young's modulus [GPa] | | |

Crystallized glass
Crystallization occurred @ 1000° C./20 min

| | | |
|---|---|---|
| α (20; 700° C.) | 9.3 | |
| α (20; 1000° C.) | 9.7 | |

Crystallization occurred @ 1040° C./200 min

| | | |
|---|---|---|
| α (20; 700° C.) | 9.7 | 9.8 |
| α (20; 1000° C.) | 9.9 | 10.3 |

The following Table 2 lists comparative examples of crystallizable or at least partially crystallized glasses.

TABLE 2

Composition of comparative examples

| | Comparative example | | | | | |
|---|---|---|---|---|---|---|
| | 1 | 2 | 3 | 4 | 5 | 6 |
| SiO₂ | 38.7 | 30 | 37 | 32 | 32 | 31.5 |
| Al₂O₃ | 1.6 | 0.3 | 7 | 5 | 1.5 | 1.5 |
| B₂O₃ | 8.9 | 1.2 | | | 8 | 8.5 |
| TiO₂ | | | | | | |
| MnO₂ | | | | | | |
| ZrO₂ | 4 | | | | | 3 |
| P₂O₅ | | 0.9 | | | | |
| Bi₂O₃ | | 0.4 | | | | |
| La₂O₃ | | | 2 | 5 | | |
| Nb₂O₅ | | | | | | |
| Ta₂O₅ | | | | 1 | | |
| Y₂O₃ | 3.4 | 1.6 | 4 | | 4.5 | |
| R₂O | | | | | | |
| ZnO | | | | 2 | | |
| MgO | 6.7 | 19.3 | 10 | 11 | 33 | 34 |
| CaO | 36.7 | 46.3 | 40 | 44 | 21 | 21.5 |
| SrO | | | | | | |
| BaO | | | | | | |
| Total | 100 | 100 | 100 | 100 | 100 | 100 |
| Σ (RO) | 43.4 | 65.6 | 50 | 57 | 54 | 55.5 |
| CaO + MgO | 43.4 | 65.6 | 50 | 55 | 54 | 55.5 |
| Σ (R₂O₃ + A₂O₅) | 3.4 | 2.9 | 6 | 6 | 4.5 | 0 |
| Σ (A₂O₅) | 0 | 0 | 0 | 1 | 0 | 0 |
| CaO/MgO | 5.48 | 2.40 | 4.0 | 4.0 | 0.64 | 0.63 |
| Characteristic temperatures [° C.] | | | | | | |
| HSM: sintering | 753 | | | | 744 | 684 |
| HSM: softening | 797 | 1386 | | | 784 | 778 |
| spherical | 898 | | | | 879 | 821 |
| hemispherical | 1111* | 1389 | | | 1139* | 1126* |
| Crystallizable glass | | | | | | |
| α(20; 300° C.) | 8.36 | | 8.73 | | 8.81 | 9.51 |
| α(20; 700° C.) | | | | | | |
| T_g [° C.] | 692 | 783 | | | 696 | 616 |
| SP [° C.] | | | | | | |
| Density[g/cm³] | | | | | | |
| t_{κ100} [° C.] | | | | | | |
| Young's modulus [GPa] | | | | | | |
| Crystallized glass | | | | | | |
| Crystallization occurred @1000° C./20 min | | | | | | |
| α (20; 700° C.) | | | | | | |
| α (20; 1000° C.) | | | | | | |
| Crystallization occurred @1040° C./200 min | | | | | | |
| α (20; 700° C.) | | | | | | |
| α (20; 1000° C.) | | | | | | |

In comparative examples 1, 5, and 6, the glass started to flow, namely at a flow temperature of 1128° C. (Comparative Example 1), 1166° C. (Comparative Example 5), and 1147° C. (Comparative Example 6).

In comparative examples 2, 3, and 4, no glass could be obtained. Rather, after having been melted, these compositions crystallized in an uncontrolled manner during cooling.

The glasses according to embodiments of the present disclosure are obtained in a glassy state from a melting process. During casting, no high annealing rate is required. Casted bodies of at least 30 cm³ were produced, i.e., with a weight of more than 100 g, inter alia. This is all the more surprising as glassy solidification is described in the specialized literature as being possible only for ribbons and on a small scale.

Crystallized or at least partially crystallized glasses according to the present disclosure exhibit particularly advantageous dimensional stability. This can be shown, for example, by the fact that the difference in shape between a sintered part made of a crystallizable glass according to embodiments of the present disclosure and the molded body comprising an at least partially crystallized glass that is obtained from the sintered part by a heat treatment for crystallization, is very small, i.e., the obtained difference in length is only in the single-digit percentage range, as is apparent from the measurement data listed in the table below. For determining these data, compacted parts with an average lateral dimension, here an average diameter, of approx. 10 to 12 mm were produced. Once sintering had been concluded, the so obtained sintered parts were heated to 1200° C. in a muffle furnace with a heating rate of 4 K per minute. The temperature of 1200° C. was kept constant for 10 minutes. This was followed by cooling. After cooling, the mean lateral dimension, here the mean diameter, was determined again. Then, the relative difference of the mean lateral dimensions before and after the heat treatment at 1200° C. was determined.

TABLE 3

Change in mean lateral dimension of sintered parts with crystallization

| | Mean lateral dimension [mm] | | Relative |
|---|---|---|---|
| Example # | Before heat treatment | After heat treatment | difference [%] |
| 1 | 11.02 | 11.09 | 0.64 |
| 2 | 11.33 | 11.44 | 0.97 |
| 3 | 11.06 | 11.79 | 6.60 |
| 4 | 10.98 | 10.97 | 0.03 |
| 5 | 10.95 | 11.31 | 3.32 |
| 6 | 10.88 | 11.38 | 4.66 |
| 7 | 10.81 | 11.00 | 1.76 |
| 8 | 10.75 | 10.79 | 0.40 |
| 9 | 11.07 | 11.16 | 0.87 |
| 10 | 10.79 | 10.83 | 0.36 |
| 11 | 10.75 | 11.25 | 4.65 |
| 12 | 10.98 | 11.30 | 2.85 |
| 13 | 10.93 | 11.39 | 4.27 |
| 14 | 10.69 | 10.76 | 0.59 |
| 15 | 10.81 | 11.16 | 3.24 |
| Comparative ex. 1 | 11.93 | melted | not determinable |
| Comparative ex. 5 | 11.26 | 14.8 | 31.45 |

The demonstrated great dimensional stability of molded bodies such as compacted parts or sintered parts, which initially comprise the crystallizable glass and are converted, by a heat treatment, into molded bodies comprising at least partially an at least partially crystallized glass, means that for example a reliable creepage distance elongation can now be achieved in a feedthrough in a particularly advantageous way. Molded bodies in particular do not round off during a heat treatment. The resistance to urea, especially in a concentration as used in AdBlue that is intended for SCR catalytic converters, and to substances resulting therefrom, is very good, so that the joins presently described can be permanently used in exhaust systems with exhaust gas cleaning systems.

BRIEF DESCRIPTION OF THE DRAWINGS

The presently disclosed embodiments will now be explained in more detail with reference to the figures, wherein:

FIG. 2 shows a cross-sectional view through a second embodiment of the joins presently disclosed, with the sectional plane running approximately through the center of this join, as illustrated in FIGS. 1 and 1a;

FIG. 3 shows a cross-sectional view through a third embodiment of the joins presently disclosed, with the sectional plane approximately running through the center of this join, as illustrated in FIGS. 1 and 1a;

FIG. 4 shows a cross-sectional view through a fourth embodiment of the joins presently disclosed, with the sectional plane approximately running through the center of the join, as illustrated in FIGS. 1 and 1a;

FIG. 5 shows a cross-sectional view through a fifth embodiment of the joins presently disclosed, with the sectional plane approximately running through the center of the join, as illustrated in FIGS. 1 and 1a;

DETAILED DESCRIPTION

For the sake of better comprehension, the components of the embodiments presently disclosed in the following detailed description are not drawn to scale, and the same reference symbols denote the same or functionally equivalent components of the respective embodiments.

Figure 1:
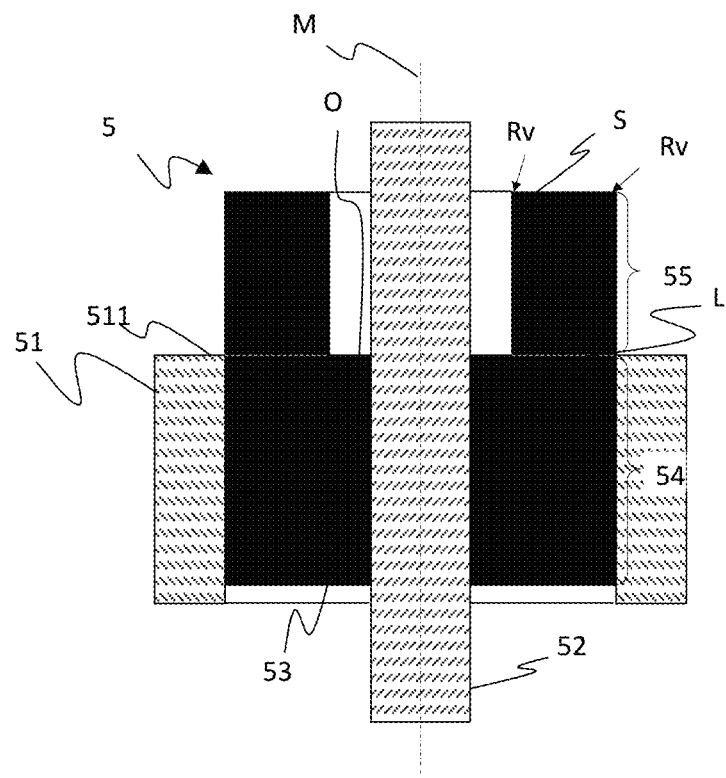
FIG. 1 shows a cross-sectional view of a first embodiment of the joins presently disclosed, with the sectional plane along plane A-A, shown in FIG. 1a, running approximately through the center of the join.
Figure 1A:
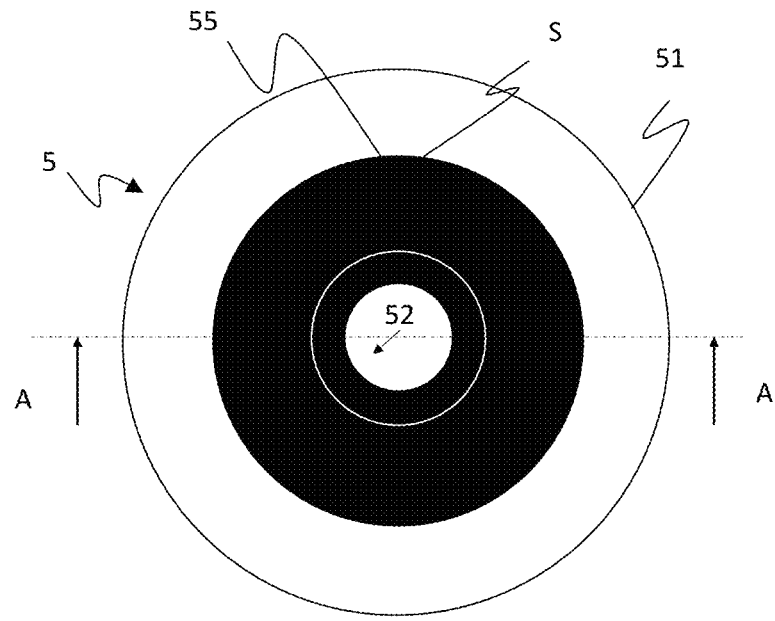
FIG. 1a shows a plan view of the first embodiment shown in cross section in FIG. 1.

FIG. 1 shows a cross-sectional view through a first embodiment of a join 5 presently disclosed, in which the sectional plane corresponding to plane A-A of FIG. 1a runs approximately through the center of the join 5 and includes the center line M.

This join 5 comprises an electrically insulating component 53 and at least two joining partners 51, 52. Without limiting the generality, joining partner 51 has a hollow cylindrical shape in the presently disclosed embodiments, and comprises a metal or a ceramic material, as will be explained in more detail below. Joining partner 52 may also be made of a metal, as will be described in more detail below, and may, for example, form part of an electrical or electronic feedthrough and thus be a constituent of an electrical or electronic link when used as intended.

At least one of the joining partners 51, 52 is kept electrically insulated from at least one further of the joining partners 51, 52 by an electrically insulating component 53.

This component 53 may comprise or may be made of the presently disclosed crystallizable or partially crystallized glass.

The insulating component 53 includes a portion 54 which extends between the joining partners 51, 52 and is bonded thereto and preferably glass-fused thereto. In the context of the present disclosure, glass-fused thereto means that the crystallizable or partially crystallized glasses, when heat treated, form an amorphous or glassy layer on their surface, which can virtually fuse to the material of the respective joining partner and in this fused state is referred to as glass-fused thereto.

The upper surface O delimiting the insulating element with respect to portion 54 is shown by a dash-dotted line L in FIG. 1, thereby merely schematically illustrating the course of the upper surface O without the structure S, i.e., without the creepage distance elongation, for comparison with a join including the structure S and therefore including the creepage distance elongation. Without the structure S, the upper surface would define a flat surface, possibly with menisci formed on the respective joining partners.

In the presently disclosed embodiments, however, a structure S is provided on this surface of portion 54 of the electrically insulating component 53 which extends between the joining partners, in the present case in particular in the form of an elevation defined by portion 55.

This portion 55 defining the structure S extends or elongates a distance along the surface of the insulating component 53 from the inner joining partner 52 to the outer joining partner 51, which distance when including the structure S, i.e., the creepage distance elongation, can be elongated by up to seven times or even more.

As a result, low-resistance deposits on the respective surface will contribute to a reduction of the electrical resistance between the joining partners 51 and 52 only to a much lesser extent.

In the case of deposits that form droplets and/or a surface film, it can be very advantageous if the structure S has edges with a rounding radius Rv of less than one tenth of a millimeter, preferably of less than one twentieth of a millimeter, and of more than 10 In this case, as a rule, often under the influence of gravity, a surface film or a coating consisting of droplets will not extend over this edge with the rounding radius Rv, thereby preventing a closed surface coverage from arising.

As an alternative to the elevation illustrated in the present embodiments, the structure S can also define a depression, which then protrudes into the insulating component 53. In any case, however, in particular the direct path along the surface from the at least one joining partner to the at least one further joining partner will be elongated compared to a surface without this structure S. Here, 'direct path' is understood to mean the shortest path along the surface from one joining partner to the other joining partner, on the one hand without the structure S, and on the other hand with the structure S according to the invention.

The structure S preferably completely surrounds at least one joining partner, in the present case the joining partner 52, in the form of an annular structure, as can be clearly seen in FIG. 1a, by way of example. In the sense of the present disclosure, the statement of 'completely surrounding' does not mean a complete three-dimensional enclosure, although this may in principle also be the case. Within the scope of the present disclosure, complete surrounding is already provided when complete annular surrounding is implemented, in particular in such a way that complete sealing can already be provided by such surrounding.

The structure S may be formed integrally with and of the same material as the portion 54 of the insulating component 53, which extends between the joining partners 51, 52 and is bonded and preferably glass-fused to each of them.

Preferably, in this case, the material of the insulating component 53 comprises an at least partially crystallized glass, as described in more detail elsewhere within the context of the present disclosure.

In this case, the insulating component 53 including the structure S can be formed in a single thermal processing sequence and in particular its crystallization degree can be adjusted.

Advantageously, the presently disclosed crystallizable glass forms an at least predominantly amorphous glass layer in the transition zone between the surface of the joining partner and the surface of the at least partially crystallized glass during the heat treatment, in particular during the glass-fusing, which glass layer will then durably remain at this location throughout continuous operation, and which preferably comprises less than 10 pores per $cm^3$ and/or preferably has a thickness of 5 μm or less, more preferably of 2 μm or less, and most preferably of 1 μm or less. In this way, a hermetic bond is obtained between the joining partners 51, 52 and the insulating component 53.

In a preferred embodiment, the structure comprises crystallizable or at least partially crystallized glass, and an at least predominantly amorphous boundary layer, in particular a glass layer, is formed on the surface of the structure, which is substantially void of open pores and in particular includes less than 10 pores per $cm^3$, and which has a thickness of 5 μm or less, preferably 2 μm or less, and most preferably 1 μm or less.

In this at least predominantly amorphous boundary layer which has a thickness of 5 μm or less, preferably 2 μm or less, and most preferably 1 μm or less, depending on the embodiment, the fraction of the amorphous or glassy phase, measured in percent by weight in each case, is greater than the fraction of all respective crystalline phases combined, also measured in percent by weight.

However, it is entirely possible that at least some of the oxides that form the glass matrix, for example $La_2O_3$, may at least partially become incorporated in crystal phases in the further course of ceramization. However, a residual content of glassy phase, albeit a small one, will normally remain, which is in particular formed by the glass matrix-forming oxides, and which forms the amorphous boundary layers mentioned above.

The inventors developed a test in order to determine whether an embodiment as presently disclosed is provided.

Figure 2:
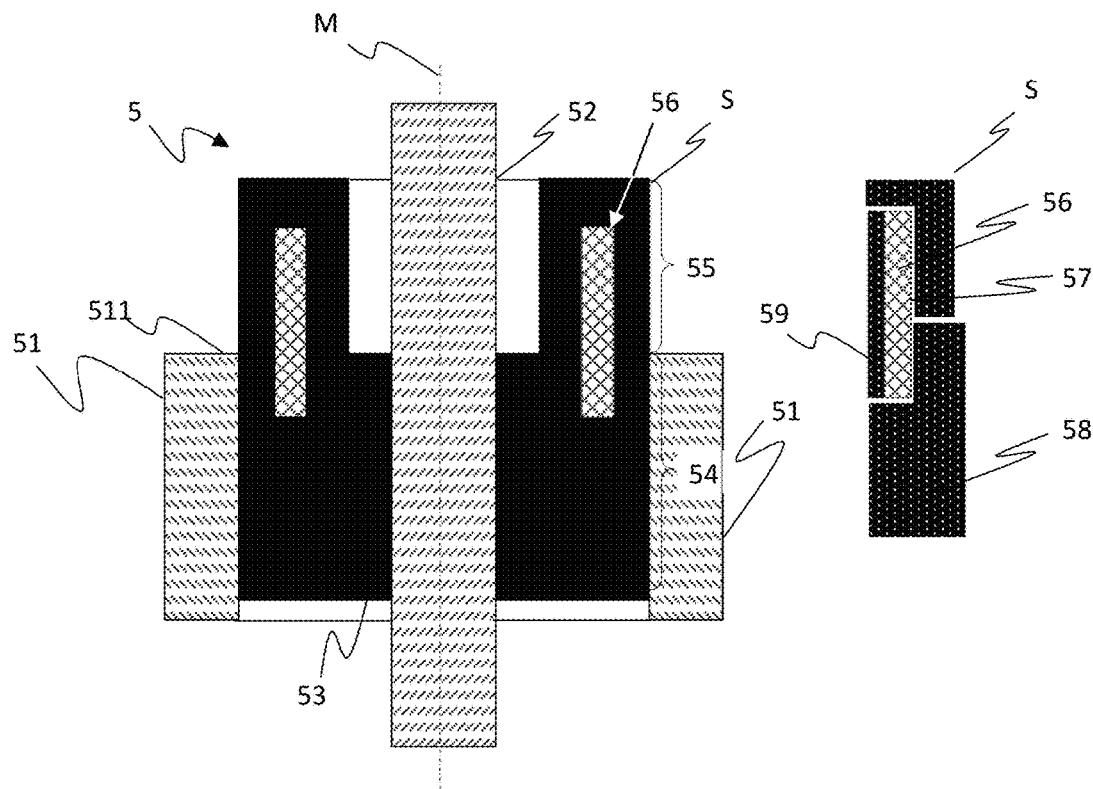
Figure 2A:
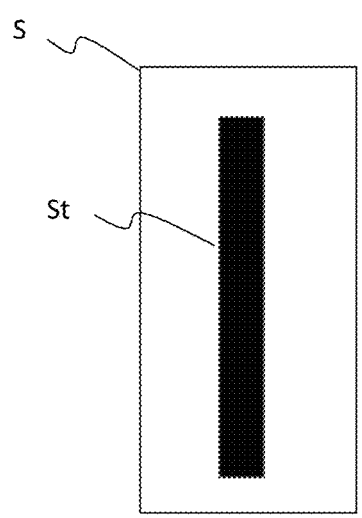
FIG. 2a shows a plan view of a creepage distance elongation of the first disclosed embodiment, on which a trace of a graphite or lead pencil can be seen.
Figure 2B:
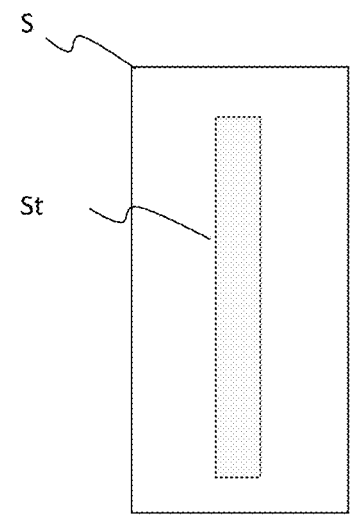
FIG. 2b shows a plan view of a creepage distance elongation of the first disclosed embodiment, on which a trace of a graphite or lead pencil can be seen after it has been at least partially removed with a cellulose cloth by a lateral wiping movement.
Figure 2C:
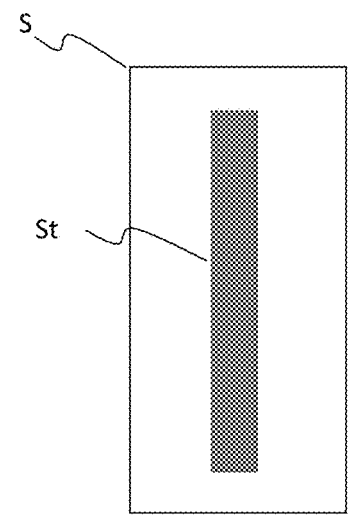
FIG. 2c shows a plan view of a creepage distance elongation of the first disclosed embodiment, on which a trace of a graphite or lead pencil can be seen after it has been at least partially removed with a cellulose cloth by a lateral wiping movement.

If a pencil such as a graphite pencil of hardness HB is used to draw a line St, by way of example, on the surface of the structure S or on the surface O, as shown in FIGS. 2a to 2c, by guiding the pencil perpendicular to the surface of the structure S with a pressure of about 100 mN, this line St will be obtained as shown in FIG. 2a in each case.

If a cellulose cloth, e.g., Zewa brand, is used to wipe parallel to the surface of the structure S or to the surface O with a contact pressure of also about 100 mN, strong removal will be caused from the components presently disclosed which comprise crystallizable glass or partially crystallized glass, since the graphite of the graphite or lead pencil cannot be retained in pores of the otherwise smooth surface. Thereby, the contrast between the line St and the surface of structure S or of surface O will typically be greatly reduced, for example to a value of less than 50% or less than 0.5, depending on the specification of the contrast.

However, in the case of components that are made of zirconium oxide, for example, if a cellulose cloth, e.g., Zewa brand, is used to wipe parallel to the surface of the structure S or to the surface O with a contact pressure of, again, about 100 mN, only slight removal will be caused because the graphite of the graphite or lead pencil can be retained in pores of the surface of the ceramic. Thereby, the contrast between the line St and the surface of structure S or of the surface O will typically be only slightly reduced, for example to a value of greater than 50% or greater than 0.5, depending on the specification of the contrast.

Figure 3:
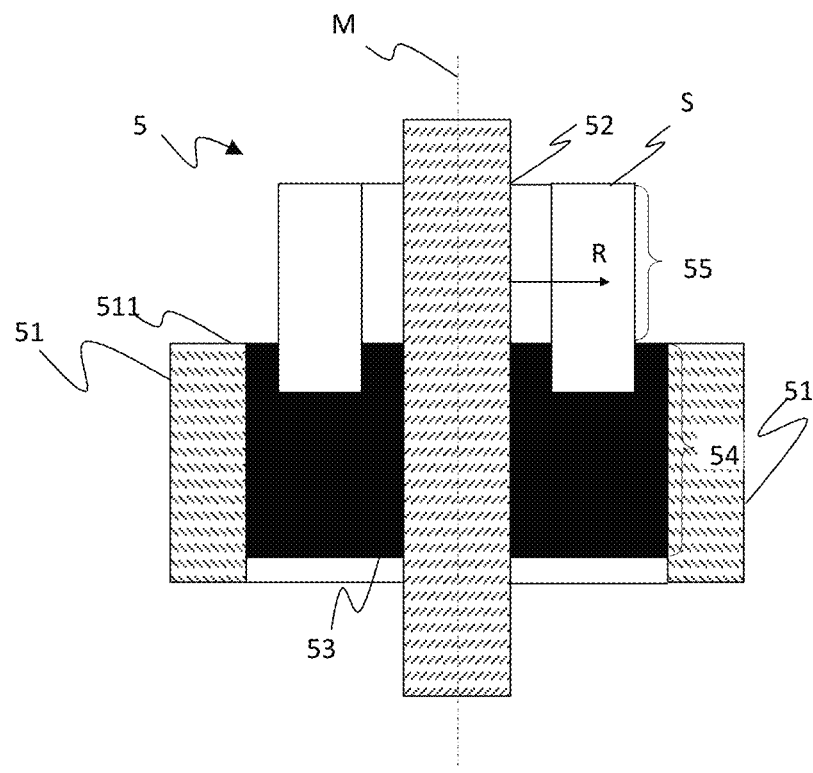
Figure 4:
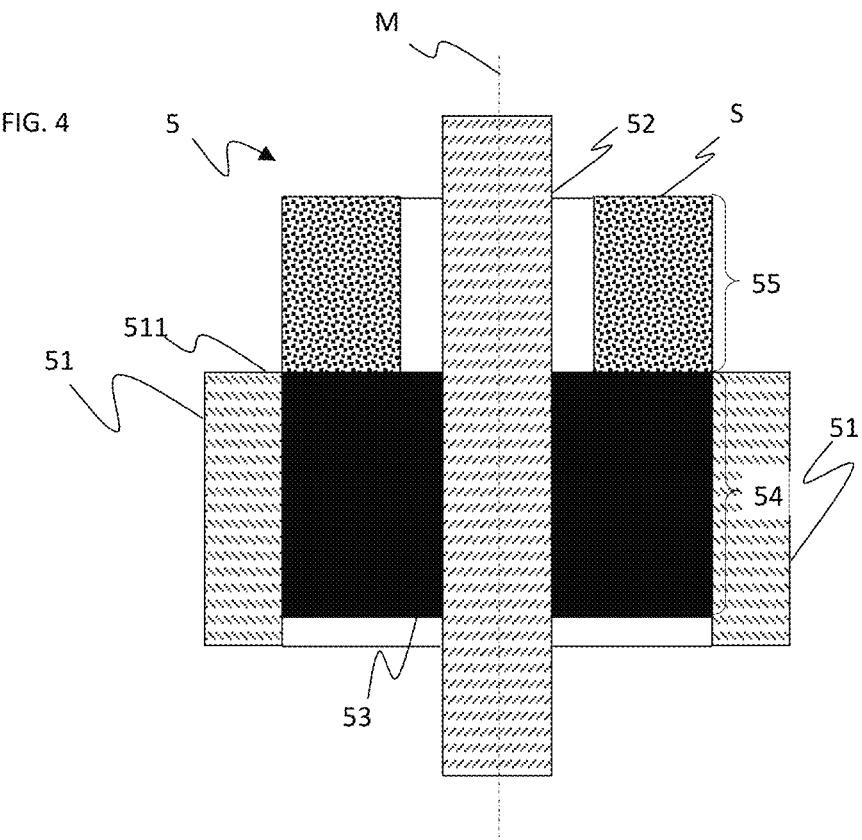

In further embodiments, as shown in FIGS. 3 and 4 merely by way of example, the structure is not made of the same material as the portion 54 of the insulating component 53 that extends between the joining partners 51, 52 and is bonded to each of the joining partners and preferably glass-fused thereto. In this case, the structure S may comprise or consist of a heat resistant ceramic compound such as forsterite, an aluminum oxide-based ceramic, or a zirconium oxide-based ceramic, for example a ceramic comprising Y-stabilized zirconium oxide. If the structure S is not made of the material according to the invention, the pencil test cannot be conducted positively either.

FIG. 2 shows a cross-sectional view through a second embodiment of the joins presently disclosed, with the sectional plane running approximately through the center of this join, as shown in FIGS. 1 and 1a.

In this embodiment, the structure S includes a reinforcement 56 which comprises or is made of a metal foil, a sheet metal, or a metallic laid scrim, mesh, or knitted fabric, wherein the metal preferably is a steel or comprises steel. This substantially ring-shaped or annular reinforcement 56 is preferably held in further insulating components 57, 58, 59, which may be in the form of sintered parts and may accommodate the reinforcement 56 and will be glass-fused thereto after the thermal treatment. The material of the substantially ring-shaped components 57, 58, and 59 may consist of the crystallizable glass presently disclosed.

FIG. 3 shows a cross-sectional view through a third embodiment of the joins presently disclosed, with the sectional plane approximately running through the center of this join, as shown in FIGS. 1 and 1a.

In this embodiment, the structure S is not made of the same material as the portion 54 of the insulating component 53 that extends between the joining partners 51, 52 and is bonded to each of the joining partners and preferably glass-fused thereto. The structure S comprises or is made of a heat resistant ceramic material such as forsterite, an aluminum oxide-based ceramic, or a zirconium oxide-based ceramic, for example a ceramic comprising Y-stabilized zirconium oxide.

As can be clearly seen in FIG. 3, the structure S protrudes into and is surrounded by the insulating component 53 such that the protruding portion of the structure S will preferably be glass-fused thereto during the heat treatment. The structure S is disposed so as to be approximately centered in a radial direction of the portion 54 of the insulating component 53 and preferably protrudes into it, at least with a portion thereof. This radial direction is indicated by an arrow R in FIG. 3.

FIG. 4 shows a cross-sectional view through a fourth embodiment of the joins presently disclosed, with the sectional plane approximately running through the center of the join, as shown in FIGS. 1 and 1a.

This further schematic view of a join 5, not drawn to scale, differs from the joins 5 shown in FIGS. 1 to 8 by the design of the structure S that provides the creepage distance elongation 55. In addition to the material of portion 54, this structure comprises a second material. This second material is also an insulating material, but differs from the material of portion 54. In this embodiment, the material of portion 54 is a crystallizable or at least partially crystallized glass, as will be described in more detail further below, and the second material has a different chemical and/or crystallographic composition. That is to say, the second material differs from the material of portion 54 in that it has a different chemical composition and/or in that it has a different crystal content. In particular, the second material may be made from or may comprise $ZrO_2$. It has been found that particularly dimensionally stable and heat resistant structures S can be obtained as creepage distance elongations if between 5 wt % and 25 wt % of a second material, preferably $ZrO_2$, are added as the second material. A content from 10 to 15 wt % is particularly preferred.

Figure 5:
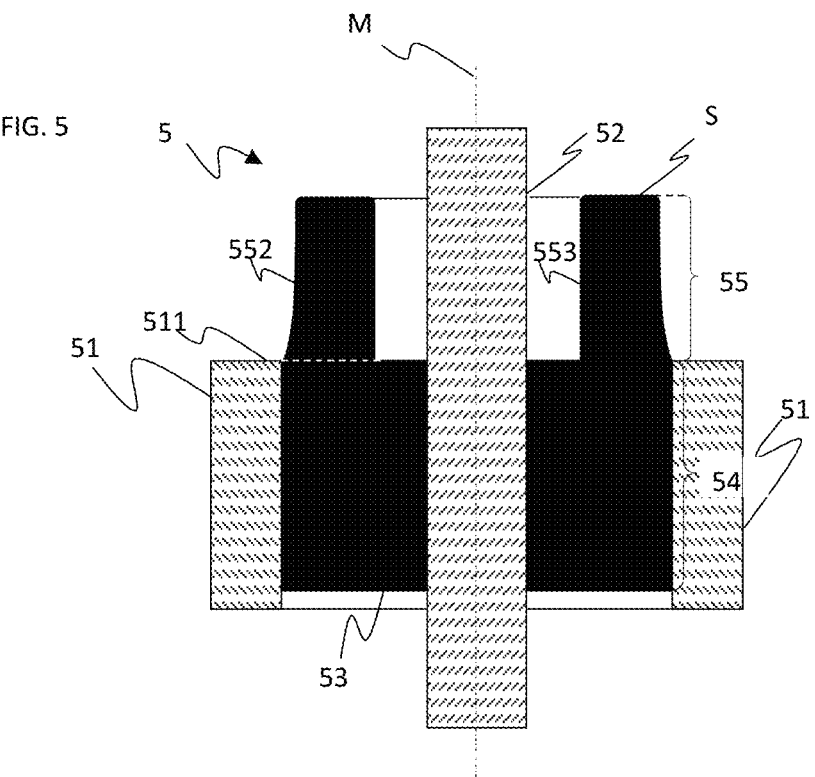

FIG. 5 shows a highly schematic view of a design of a join 5 according to a fifth embodiment. Here, the outer lateral surface 552 of portion 55 has a slightly arcuate or curved shape, i.e., it is not completely planar. By contrast, the inner lateral surface 553 of portion 55 is planar here. As can be seen from FIG. 5, the degree of planarity of lateral surface 552 is different from the degree of planarity of lateral surface 553. Although, lateral surface 552 is shown somewhat not true to scale here, since in reality the lateral surfaces will not exhibit such a large deviation from a planar design.

Figure 6:
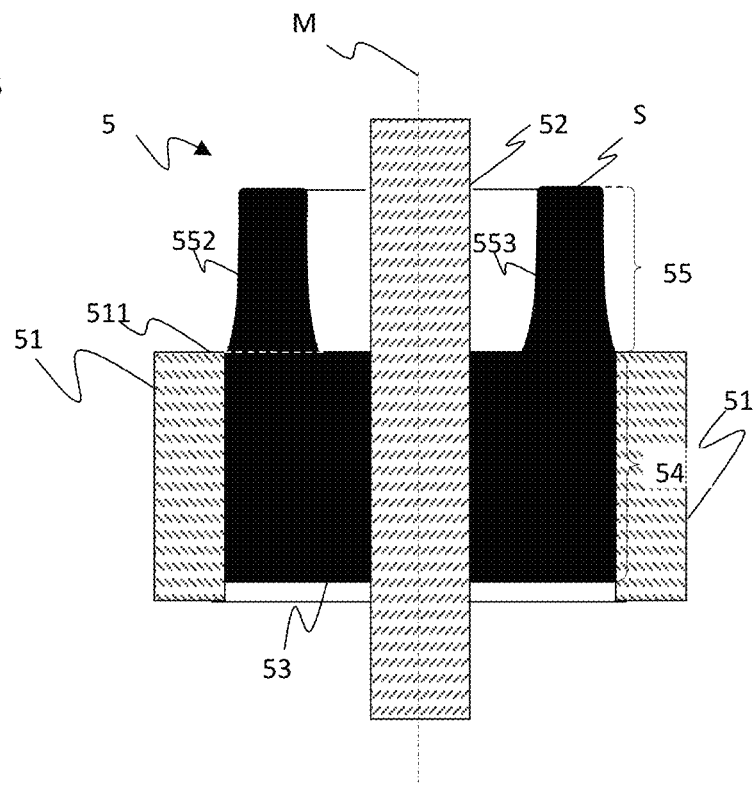
FIG. 6 shows a cross-sectional view through a sixth embodiment of the joins presently disclosed, with the sectional plane approximately running through the center of the join.

FIG. 6 shows the case of a join 5 according to a further, sixth embodiment, in which both the inner and the outer lateral surfaces 552 and 553 are not perfectly planar or flat. However, in this case, both lateral surfaces 552 and 553 exhibit the same degree of planarity. Here, again, the drawing is not true to scale in order to allow to illustrate the effect of a not completely planar lateral surface. Usually, significantly smaller deviations from a planar lateral surface are obtained.

Figure 7:
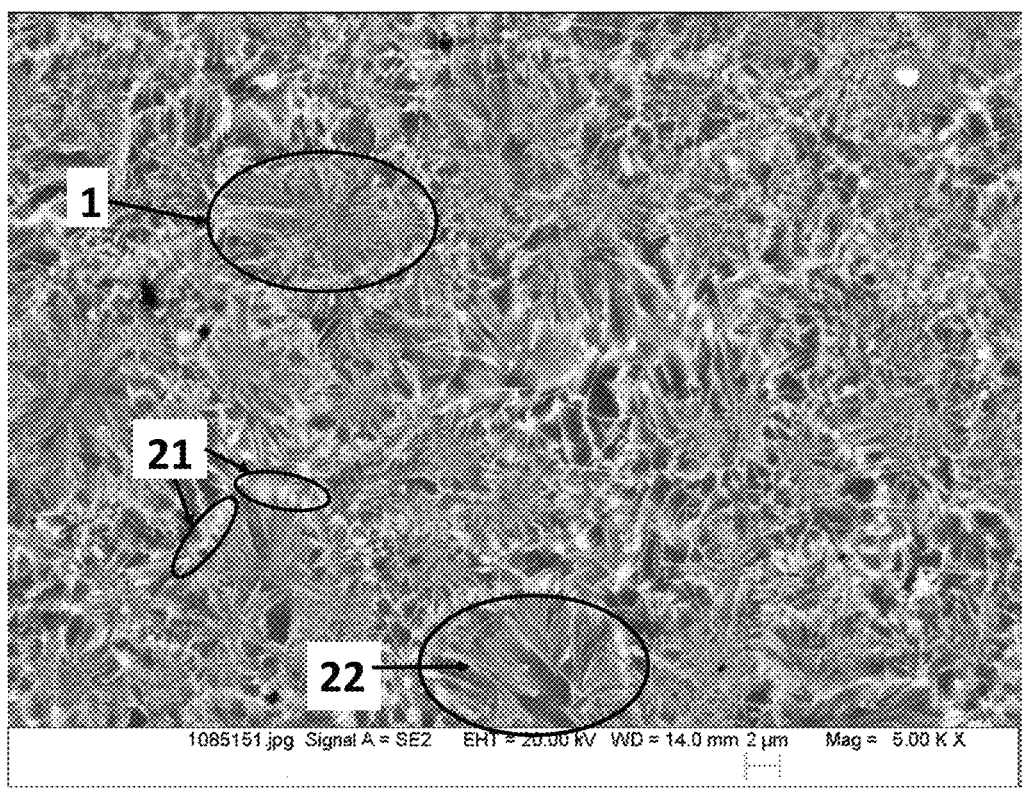
FIGS. 7 to 10 are scanning micrographs of at least partially crystallized glasses according to embodiments of the present disclosure.

FIG. 7 shows a first scanning micrograph of an at least partially crystallized glass according to an embodiment of the disclosure. The at least partially crystallized glass comprises crystal aggregates 1 formed by a large number of crystallites, and these crystallites are preferably needle-shaped. In FIG. 1, one crystal aggregate 1 is indicated as such, by way of example. Furthermore, crystallites 21 can be seen at grain boundaries and are indicated by way of example, as well as needle-shaped crystallites 22.

Figure 8:
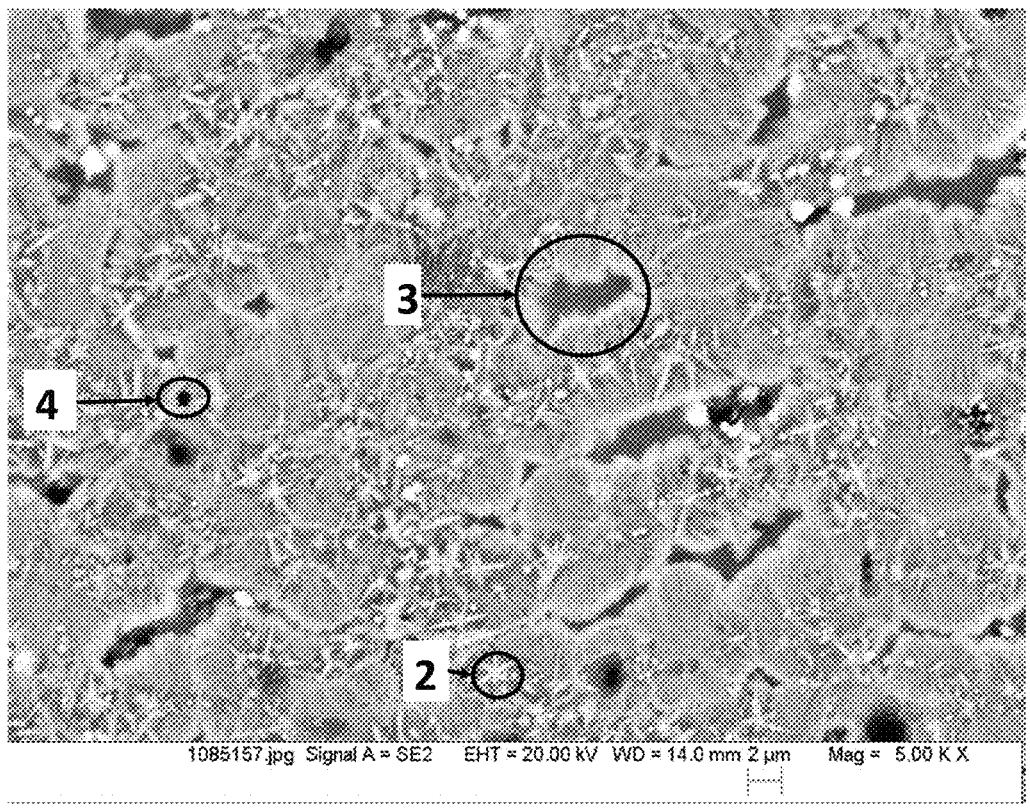

FIG. 8 shows a second scanning micrograph of an at least partially crystallized glass according to a further embodiment of the disclosure. Here, too, the at least partially crystallized glass comprises crystal aggregates formed by a large number of crystallites, which are preferably needle-shaped. Moreover, pores are in part located between the individual crystallites, and, furthermore, the at least partially crystallized glass comprises a residual glass phase disposed between the crystallites. By way of example, crystallites 2 are designated here, which form a star-shaped crystal aggregate in this case. Also, the residual glass phase 3 can be seen, which has a gray color in the scanning micrograph, as well as the (black colored) pore 4 which is designated by way of example.

Figure 9:
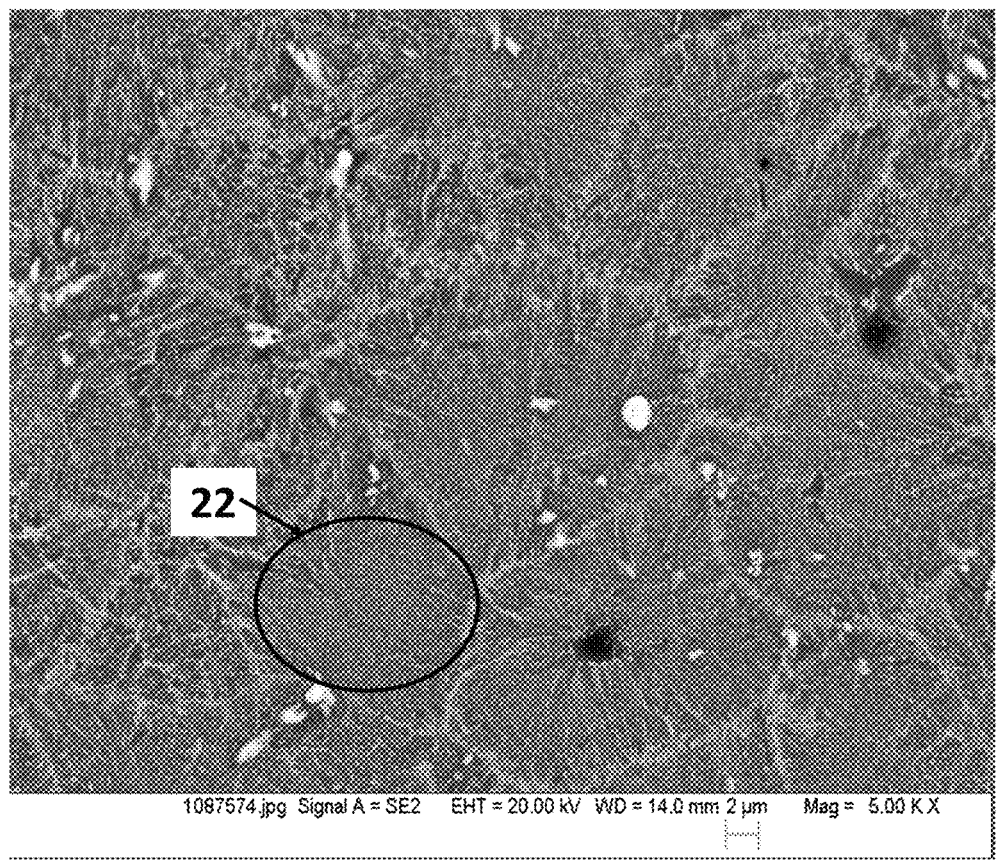

FIG. 9 shows a third scanning micrograph of yet another at least partially crystallized glass according to an embodiment of the disclosure. Here, again, the crystal aggregates can be seen. The crystallites are so fine, here, that they are hardly recognizable as such at the selected resolution. In this way, a very dense, fine structure is achieved. By way of example, reference can be made, here, to the very fine crystals designated by 22.

Figure 10:
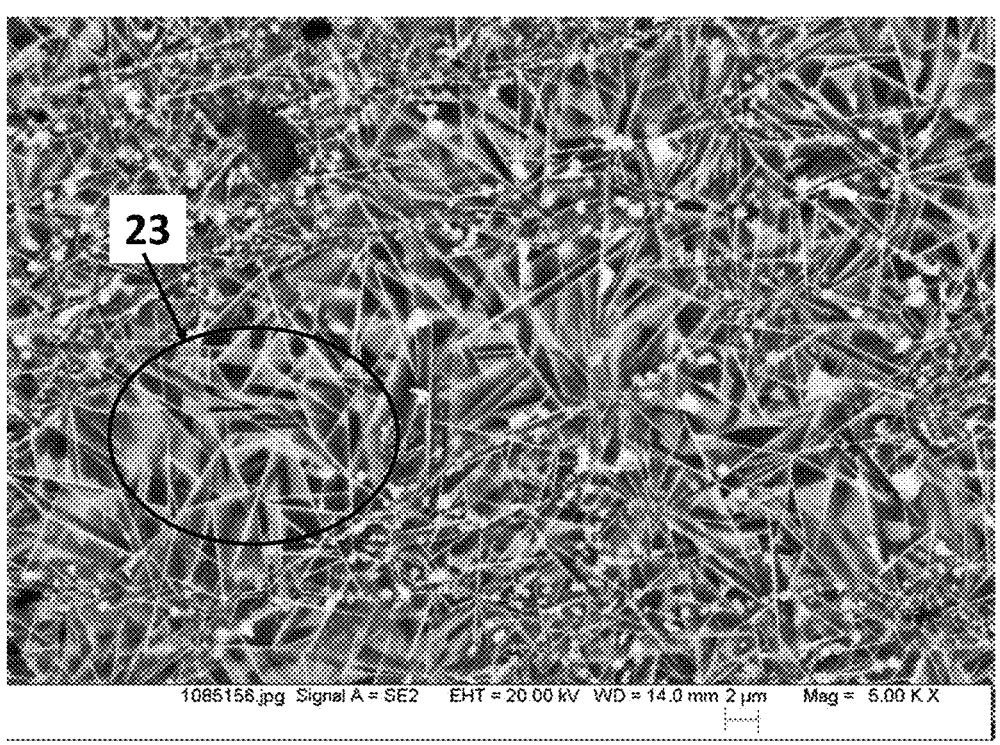

FIG. 10 is yet another scanning micrograph of yet another at least partially crystallized glass according to an embodiment of the disclosure. In contrast to the crystallites of the at least partially crystallized glass shown in FIG. 9, the crystallites 23 forming part of the crystal aggregates of the at least partially crystallized glass are not this fine here, rather it can be seen that they have a rod-like or possibly platelet-shaped form. The crystallites 23 are interlocked with one another here, similar to a "house of cards structure".

Figure 11:
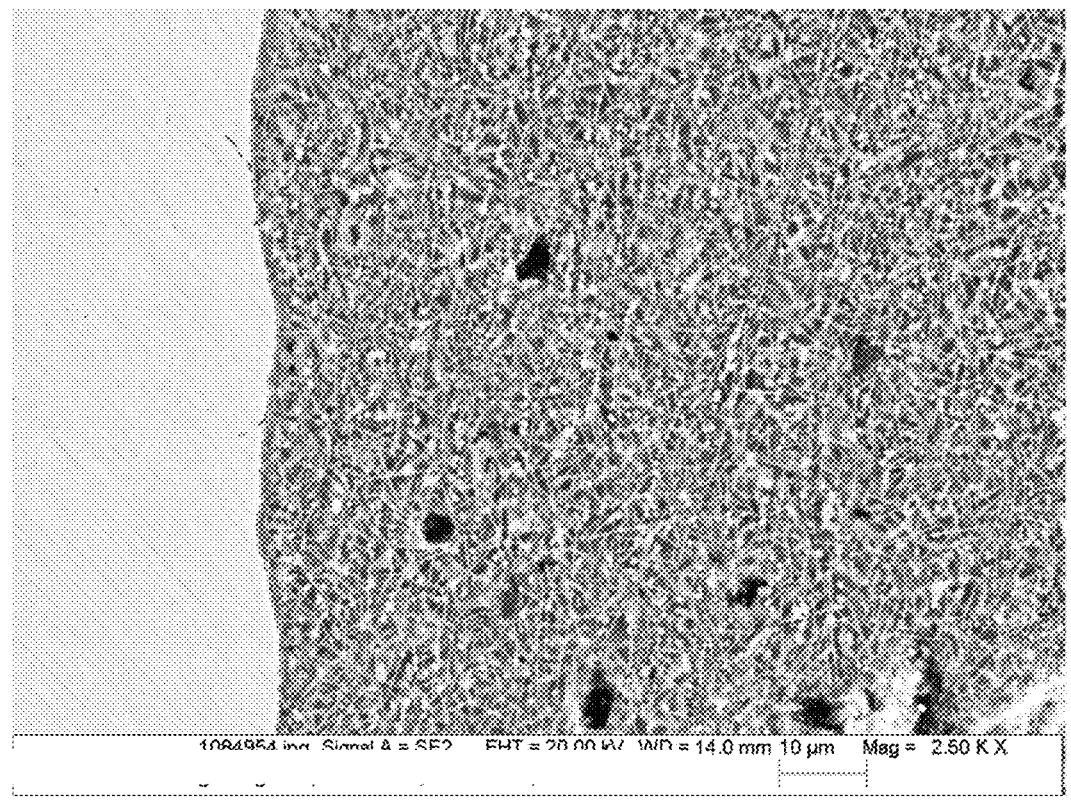
FIG. 11 shows a scanning micrograph of a join according to an embodiment of the present disclosure.

FIG. 11 shows a scanning micrograph of a join according to one embodiment of the disclosure. At the interface of the joining partner arranged on the left of the image to the at least partially crystallized glass, a very thin boundary layer is formed, which comprises less than 10 pores per $cm^3$. This is an at least predominantly amorphous glass layer which has a thickness of 5 µm or less, preferably 2 µm or less, and most preferably 1 µm or less.

The following statements are made for all of the embodiments disclosed above.

The embodiments described above were only described with regard to two joining partners. However, it comes within the scope of the present disclosure that three or more joining partners can be held together in a join by the insulating component, similarly as presently disclosed.

The joins presently disclosed provide for a multifold elongation of the creepage distance, and an elongation by a factor of more than 7 was achieved.

What is furthermore advantageous is the combination of water resistance in environments susceptible to electrocorrosion and the high dimensional stability of the joins presently disclosed.

The sufficiently high electrical resistance of the crystallizable glass makes it eligible for being used as a creepage distance elongation even under water condensation (in general) or even coolant (e.g., as a feedthrough in an electric compressor).

One advantage over ceramics is the closed porosity of the structure S, i.e., of the protruding material.

Continuous duty applications include feedthroughs for electricity or power supply for heating components (e.g., primarily for use in heatable catalytic converter elements), sensors in exhaust gas systems, and generally as a feedthrough for electric compressors, primarily in automotive applications.

In the embodiments disclosed above, the crystallites may at least partially include crystallization nuclei at the grain boundaries, and/or lanthanum enrichments may at least in part be located at the grain boundaries of the crystallites, in particular comprising lanthanum compounds.

During operation, the crystal aggregates of the presently disclosed crystallizable or partially crystallized glasses can counteract a displacement of volume elements of the at least partially crystallized glass relative to one another.

In the joins presently disclosed, the surface of the at least partially crystallized glass has no meniscus.

In the joins presently disclosed, the joining partner may comprise a metal, in particular a metal from the group of steels, e.g., normal steels, high-grade steels, stainless steels, and heat resistant ferritic steels, also known under the brand name Thermax, e.g., Thermax 4016, Thermax 4742, or Thermax 4762, or Crofer 22 APU, or CroFer 22 H, or NiFe-based materials, e.g., NiFe45, NiFe47, or nickel-plated pins, or known under the brand name Inconel, e.g., Inconel 718 or X-750, or steels such as known under the designations CF25, Alloy 600, Alloy 601, Alloy 625, Alloy 690, SUS310S, SUS430, SUH446, or SUS316, or austenitic steels such as 1.4762, 1.4828, or 1.4841, Kanthal heating wire, or a heat-resistant ceramic compound such as forsterite, an aluminum oxide-based ceramic, or a zirconium oxide-based ceramic, for example a ceramic comprising Y-stabilized zirconia.

The joins presently disclosed exhibit a helium leak rate of less than $10^{-8}$ mbar*l/s and/or comprise an at least partially crystallized glass which has a Young's modulus between 80 GPa and 200 GPa, preferably a Young's modulus between 100 GPa and 125 GPa.

In the crystallizable or at least partially crystallized glass presently disclosed, the CaO content of the crystallizable or at least partially crystallized glass can range between at least 35 mol % and at most 46 mol %, preferably between at least 35 mol % and less than 43.5 mol %, and/or the MgO content of the crystallizable or at least partially crystallized glass can range between 5 mol % and less than 13 mol %.

In the case of the presently disclosed crystallizable or at least partially crystallized glass, the glass may be provided in the form of an at least partially crystallized glass and may have a coefficient of linear thermal expansion of more than $9*10^{-6}$/K, preferably more than $10*10^{-6}$/K in the temperature range from 20° C. to 700° C., wherein, most preferably, the coefficient of linear thermal expansion of the at least partially crystallized glass is greater than $9*10^{-6}$/K, preferably greater than $9.5*10^{-6}$/K in the temperature range from 20° C. to 1000° C.

In the case of the presently disclosed crystallizable or at least partially crystallized glass, the glass may be provided in the form of a crystallizable glass and may have a transition temperature $T_g$ of more than 720° C.

In the case of the crystallizable or at least partially crystallized glass presently disclosed, the crystallizable glass may exhibit a temperature, $t_{K100}$, for an electrical resistivity of $10^8$ Ω·cm, preferably determined according to DIN 52326, of 500° C. or more.

In the case of the presently disclosed crystallizable or at least partially crystallized glass, the at least partially crystallized glass may include crystallites of calcium-magnesium silicates, preferably of CaO-rich calcium-magnesium silicates, in particular of CaO-rich calcium-magnesium island silicates and/or group silicates, such as merwinite and/or a solid solution with a merwinite structure, and alternatively or additionally a crystal phase with a melilite structure, such as åkermanite $Ca_2MgSi_2O_7$ and/or gehlenite $Ca_2Al[AlSiO_7]$ and/or solid solutions thereof, and/or a crystal phase with an augite structure.

LIST OF REFERENCE SYMBOLS

1 Crystal aggregate
2 Crystallite
21 Crystallites at grain boundaries
22 Needle-shaped crystallites
23 Rod-shaped or platelet-shaped crystallites
3 Residual glass
4 Pore
5 Join
51 First joining partner
511 Upper edge of first joining partner
52 Second joining partner
521 Upper edge of second joining partner
53 Insulating component
54 Portion of insulating component disposed between the joining partners
55 Portion of insulating component protruding beyond joining partner 51, creepage distance elongation
56 Reinforcement
57 Substantially annular component
58 Substantially annular component
59 Substantially annular component
M Center line
S Structure providing the creepage distance elongation
O Upper surface of insulating component 53
Rv Rounding radius on the edge
St Line drawn with a pencil on the surface of structure S or on surface O
R Radial direction

What is claimed is:

1. A join comprising:
   an electrically insulating component; and
   two joining partners secured to one another and electrically insulated from one another by the electrically insulating component,
   wherein the electrically insulating component comprises a surface that extends between the two joining partners, the surface defining a structure selected from a group consisting of an elevation, a depression, and any combinations thereof,
   wherein the structure elongates a direct path along the surface,
   wherein the structure completely surrounds at least one of the two joining partners, and
   wherein the electrically insulating component and/or the structure comprises a glass that is at least partially crystallized,
   wherein the glass comprises:
   $La_2O_3$ more than 0.3 mol % to less than 5 mol %;
   $Nb_2O_5$ 0 mol % to 9 mol %;
   $Ta_2O_5$ 0 mol % to 7 mol %;
   $\Sigma(A_2O_5)$ more than 0.2 mol % to 9 mol %,
   where A is an element which, in oxides, has an oxidation number V+.

2. The join of claim 1, wherein the electrically insulating component is bonded or glass-fused to each of the two joining partners.

3. The join of claim 1, wherein the structure is integral with the electrically insulating component and is made of the glass.

4. The join of claim 3, wherein the electrically insulating component further comprises a predominantly amorphous glass layer between the electrically insulating component and the two joining partners, wherein the predominantly amorphous glass layer comprises a property selected from a group consisting of less than 10 pores per $cm^3$, a thickness of 5 μm or less, a thickness of 2 μm or less, a thickness of 1 μm or less, and combinations thereof.

5. The join of claim 4, wherein the predominantly amorphous glass layer is on the structure.

6. The join of claim 1, wherein the structure is made of a material that is different from the surface, and wherein the structure is bonded or glass-fused to each of the two joining partners.

7. The join of claim 6, wherein the structure comprises a heat-resistant ceramic material selected from a group consisting of forsterite, aluminum oxide-based ceramic, zirconium oxide-based ceramic, and Y-stabilized zirconium oxide ceramic.

8. The join of claim 6, wherein the structure is disposed on the electrically insulating component so as to be centered in a radial direction thereof.

9. The join of claim 8, wherein the structure protrudes into the electrically insulating component.

10. The join of claim 1, wherein the structure comprises a reinforcement selected from a group consisting of a metal foil, a metal sheet, a metallic laid scrim, a mesh, and a knitted fabric.

11. The join of claim 1, wherein the structure comprises a reinforcement that consists of steel or ferritic steel.

12. The join of claim 1, wherein the structure has edges with a rounding radius of less than one tenth of a millimeter.

13. The join of claim 1, wherein the glass comprises a feature selected from a group consisting of: a residual glass fraction of less than 10%, a residual glass fraction of less than 5%, crystal aggregates, needle-shaped crystallites, platelet-shaped crystallites, rod-shaped crystallites, platelet-shaped crystallites, crystallites arranged in a radiating pattern, crystallites arranged in a spherulitic pattern, crystallites arranged in a fan-shaped pattern, a Young's modulus between 80 GPa and 200 GPa, and a Young's modulus between 100 GPa and 125 GPa.

14. The join of claim 1, wherein A comprises an element selected from a group consisting of Nb, Ta, P, and mixtures thereof.

15. The join of claim 1, wherein the glass comprises crystallites having crystallization nuclei at grain boundaries and/or crystallites having grain boundaries with enrichments in lanthanum arranged thereon.

16. The join of claim 1, further comprising a difference, as an absolute value, between thermal expansion coefficients of the two joining partners and the glass that is $5*10^{-6}$/K or less.

17. The join of claim 1, further comprising a property selected from a group consisting of a heat resistance that withstands operating temperatures of at least 1000° C., a shock-resistance according to ISO 16750-3, a vibration-resistance according to ISO 16750-3, a helium leak rate of less than $10^{-8}$ mbar*l/s, and any combinations thereof.

18. The join of claim 1, wherein the surface is free of any meniscus.

19. The join of claim 1, wherein the two joining partners are made of materials selected from a group consisting of metal, steel, normal steels, high-grade steel, stainless steel, heat resistant ferritic steel, Thermax, Thermax 4016, Thermax 4742, Thermax 4762, Crofer 22 APU, CroFer 22 H, NiFe-based materials, NiFe45, NiFe47, nickel-plated pins, Inconel, Inconel 718, Inconel X-750, CF25, Alloy 600, Alloy 625, Alloy 690, SUS310S, SUS430, SUH446, SUS316, austenitic steel 1.4828, austenitic steel 1.4841, aluminum oxide-based ceramic, zirconium oxide-based ceramic, and Y-stabilized zirconia ceramic.

20. The join of claim 1, wherein the join is configured for a use selected from a group consisting of an exhaust gas sensor, a pressure sensor, a particle sensor, a soot particle sensor, a temperature sensor, a $NO_x$ sensor, an oxygen sensor, a compress feedthrough, an e-compressor feedthrough, an electrical power feedthrough of an exhaust gas component, a fuel cell feedthrough, and a chemical reactor a feedthrough.

21. A glass that is crystallizable or at least partially crystallized, comprising:
$La_2O_3$ more than 0.3 mol % to less than 5 mol %;
$Nb_2O_5$ 0 mol % to 9 mol %;
$Ta_2O_5$ 0 mol % to 7 mol %;
$\Sigma(A_2O_5)$ more than 0.2 mol % to 9 mol %,
where A is an element having an oxidation number V+ in oxides.

22. The glass of claim 21, wherein A comprises an element selected from a group consisting of Nb, Ta, P, and mixtures thereof.

23. The glass of claim 21, further comprising an oxide RO, with $\Sigma(RO) \leq 55$ mol %, where R is an element which, in oxides, has an oxidation number II+.

24. A join comprising:
an electrically insulating component; and
two joining partners secured to one another and electrically insulated from one another by the electrically insulating component,
wherein the electrically insulating component comprises a surface that extends between the two joining partners, the surface defining a structure selected from a group consisting of an elevation, a depression, and any combinations thereof,
wherein the electrically insulating component comprises a predominantly amorphous glass layer between the electrically insulating component and the two joining partners,
wherein the predominantly amorphous glass layer comprises a property selected from a group consisting of: less than 10 pores per $cm^3$, a thickness of 5 μm or less, a thickness of 2 μm or less, a thickness of 1 μm or less, and combinations thereof,
wherein the structure elongates a direct path along the surface,
wherein the structure completely surrounds at least one of the two joining partners, and
wherein the electrically insulating component and/or the structure comprises a glass that is at least partially crystallized.

25. The join of claim 24, wherein the structure is integral with the electrically insulating component and is made of the glass.

26. A join comprising:
an electrically insulating component; and
two joining partners secured to one another and electrically insulated from one another by the electrically insulating component,
wherein the electrically insulating component comprises a surface that extends between the two joining partners, the surface defining a structure selected from a group consisting of an elevation, a depression, and any combinations thereof,
wherein the structure elongates a direct path along the surface,
wherein the structure completely surrounds at least one of the two joining partners, and
wherein the electrically insulating component and/or the structure comprises a glass that is at least partially crystallized,
wherein the structure is made of a material that is different from the surface, and wherein the structure is bonded or glass-fused to each of the two joining partners,
wherein the structure is disposed on the electrically insulating component so as to be centered in a radial direction thereof,
wherein the structure protrudes into the electrically insulating component.

* * * * *